United States Patent
Xiong et al.

(10) Patent No.: US 10,966,283 B2
(45) Date of Patent: Mar. 30, 2021

(54) DETERMINATION OF AN ADVANCED PHYSICAL UPLINK CHANNEL RESOURCE

(71) Applicant: APPLE INC., Cupertino, CA (US)

(72) Inventors: Gang Xiong, Portland, OR (US); Hong He, Sunnyvale, CA (US); Ajit Nimbalker, Fremont, CA (US); Joonyoung Cho, Portland, OR (US); Jong-Kae Fwu, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 309 days.

(21) Appl. No.: 15/781,462

(22) PCT Filed: Apr. 29, 2016

(86) PCT No.: PCT/US2016/030171
§ 371 (c)(1),
(2) Date: Jun. 4, 2018

(87) PCT Pub. No.: WO2017/119921
PCT Pub. Date: Jul. 13, 2017

(65) Prior Publication Data
US 2020/0260526 A1   Aug. 13, 2020

Related U.S. Application Data

(60) Provisional application No. 62/274,560, filed on Jan. 4, 2016.

(51) Int. Cl.
  *H04W 88/06* (2009.01)
  *H04W 76/11* (2018.01)
  (Continued)

(52) U.S. Cl.
  CPC .......... *H04W 88/06* (2013.01); *H04L 5/0039* (2013.01); *H04L 5/0051* (2013.01); *H04L 5/10* (2013.01);
  (Continued)

(58) Field of Classification Search
  CPC ..... H04W 88/06; H04W 76/11; H04W 76/27; H04W 80/08; H04W 72/0413;
  (Continued)

(56) References Cited

U.S. PATENT DOCUMENTS

| | | | |
|---|---|---|---|
| 2012/0014320 A1* | 1/2012 | Nam | ...................... H04L 5/0016 370/328 |
| 2012/0236735 A1* | 9/2012 | Nory | ................... H04W 52/367 370/252 |

(Continued)

FOREIGN PATENT DOCUMENTS

| | | |
|---|---|---|
| EP | 2942896 A1 | 11/2015 |
| WO | 2011085230 A2 | 7/2011 |

(Continued)

*Primary Examiner* — Phong La

(57) ABSTRACT

Technology for a user equipment (UE) using a self-contained time division duplex (TDD) subframe to communicate with an eNodeB within a wireless communication network is disclosed. The UE can determine, at the UE, an advanced physical uplink control channel (xPUCCH)

(Continued)

600

| Bit field in DCI for xPUCCH resource allocation | $n_{xPUCCH}^{(p)}$ |
|---|---|
| '00' | The 1st xPUCCH resource value configured by the higher layers |
| '01' | The 2nd xPUCCH resource value configured by the higher layers |
| '10' | The 3rd xPUCCH resource value configured by the higher layers |
| '11' | The 4th xPUCCH resource value configured by the higher layers | resource index to designate one or more physical resources for transmission of the xPUCCH, wherein the one or more physical resources are multiplexed using at least one or more of frequency division multiplexing (FDM), code division multiplexing (CDM), or combination thereof. The UE can signal a transceiver of the UE to transmit to the eNodeB up link control information (UCI) using the one or more physical resources designated by the xPUCCH resource index.

29 Claims, 14 Drawing Sheets

(51) Int. Cl.
| | | |
|---|---|---|
| | *H04W 76/27* | (2018.01) |
| | *H04L 5/00* | (2006.01) |
| | *H04L 5/10* | (2006.01) |
| | *H04W 72/04* | (2009.01) |
| | *H04W 72/14* | (2009.01) |
| | *H04W 80/08* | (2009.01) |

(52) U.S. Cl.
CPC ..... *H04W 72/042* (2013.01); *H04W 72/0413* (2013.01); *H04W 72/14* (2013.01); *H04W 76/11* (2018.02); *H04W 76/27* (2018.02); *H04W 80/08* (2013.01)

(58) Field of Classification Search
CPC .. H04W 72/042; H04W 72/14; H04L 5/0051; H04L 5/10
USPC .......................................................... 370/329
See application file for complete search history.

(56) References Cited

U.S. PATENT DOCUMENTS

| | | | | |
|---|---|---|---|---|
| 2013/0182623 | A1* | 7/2013 | Fan | H04W 4/70 370/311 |
| 2014/0105155 | A1* | 4/2014 | Kim | H04W 72/0413 370/329 |
| 2015/0304994 | A1* | 10/2015 | Kim | H04W 72/042 370/280 |
| 2015/0341922 | A1* | 11/2015 | Han | H04L 47/12 370/280 |
| 2016/0374027 | A1* | 12/2016 | Dinan | H04W 52/50 |
| 2017/0064683 | A1* | 3/2017 | Seo | H04L 5/001 |
| 2017/0215172 | A1* | 7/2017 | Yang | H04L 27/2601 |
| 2018/0110041 | A1* | 4/2018 | Bendlin | H04L 5/0051 |
| 2018/0213524 | A1* | 7/2018 | Xiao | H04W 52/34 |
| 2018/0359762 | A1* | 12/2018 | Xiong | H04W 72/0413 |
| 2019/0141700 | A1* | 5/2019 | Kwak | H04L 27/26 |

FOREIGN PATENT DOCUMENTS

| | | | | |
|---|---|---|---|---|
| WO | WO-2011085230 | A2 * | 7/2011 | .......... H04L 1/1671 |
| WO | 2017087022 | A1 | 5/2017 | |

* cited by examiner

600

| Bit field in DCI for xPUCCH resource allocation | $n_{xPUCCH}^{(p)}$ |
|---|---|
| '00' | The 1st xPUCCH resource value configured by the higher layers |
| '01' | The 2nd xPUCCH resource value configured by the higher layers |
| '10' | The 3rd xPUCCH resource value configured by the higher layers |
| '11' | The 4th xPUCCH resource value configured by the higher layers |

| Bit field in DCI for xPUCCH resource allocation | $L_{xPUCCH}$ |
|---|---|
| '00' | 1M |
| '01' | 2M |
| '10' | 4M |
| '11' | 8M |

FIG. 8

DETERMINATION OF AN ADVANCED PHYSICAL UPLINK CHANNEL RESOURCE

BACKGROUND

Wireless mobile communication technology uses various standards and protocols to transmit data between a node (e.g., a transmission station such as an eNodeB) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node to the wireless device (e.g., UE), and the uplink (UL) transmission can be a communication from the wireless device to the node.

Currently, a longer Hybrid automatic repeat request (HARQ) acknowledgement (HARQ-ACK) transmission latency is expected for certain downlink (DL) and uplink (UL) configurations for Time-Division Duplex (TDD) system compared to FDD system. This is primarily due to the fact that the DL or UL subframe may not be available at the time for HARQ-ACK transmission. Accordingly, it is desired for a solution to provide functionality and protocols that are scalable and efficient to reduce the longer HARQ-ACK transmission latency, and enable TDD downlink (DL) and/or Uplink (UL) traffic adaptation.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6 illustrates a table of advanced physical uplink control channel (xPUCCH) resource values for xPUCCH resource allocation in accordance with an example;

FIG. 8 illustrates a table of advanced physical uplink control channel (xPUCCH) resource values for xPUCCH resource allocation in accordance with an example;

Figure 1:
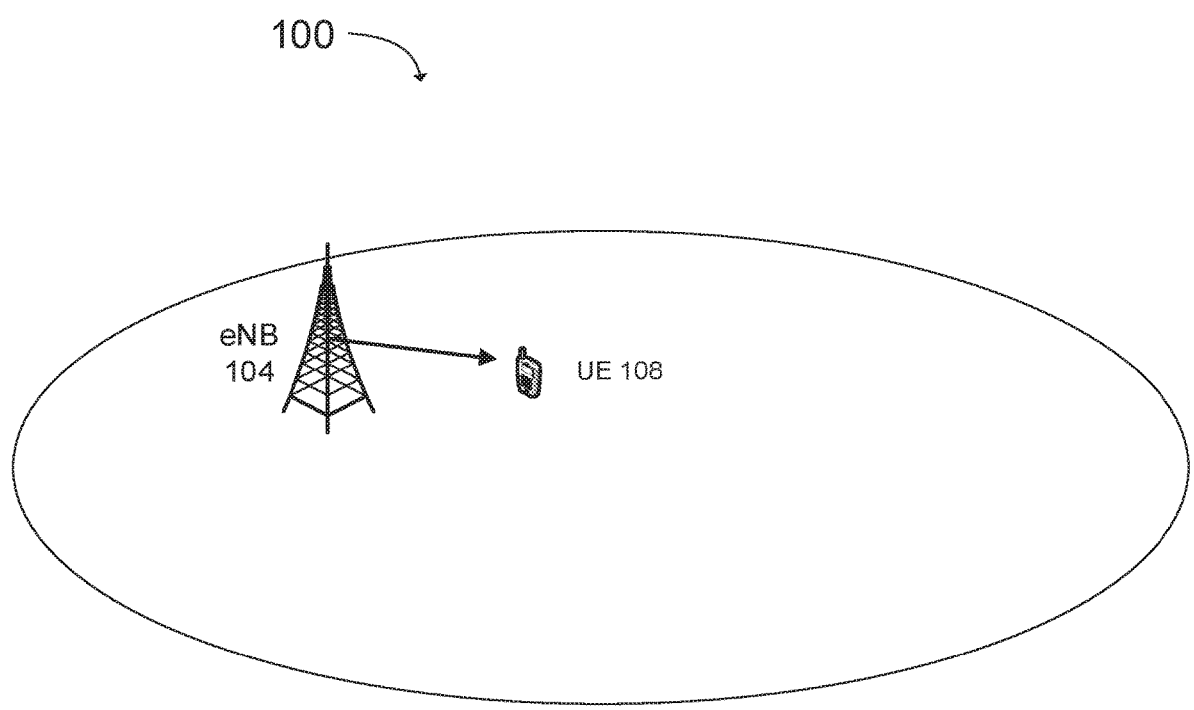
FIG. 1 illustrates a mobile communication network within a cell in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. Third generation partnership project (3GPP) next generation wireless communication system fifth generation (5G) can provide access to information and sharing of data anywhere, anytime by various users and applications. In one aspect, 5G can be a unified network/system targeted to meet vastly different, and often times conflicting, performance dimensions and services. Such diverse multi-dimensional constraints can be driven by different services and applications.

However, in existing 3GPP LTE specifications, such as Rel. 12, longer Hybrid automatic repeat request (HARQ) acknowledgement (HARQ-ACK) transmission latency can be expected for certain downlink (DL) and uplink (UL) configurations for Time-Division Duplex (TDD) system compared to a frequency division duplex (FDD) system. The longer HARQ-ACK transmission latency can be primarily due to the fact that the DL or UL subframe may not be available at the time for HARQ-ACK transmission.

To enable low latency transmission for enhanced mobile broadband communication, a self-contained TDD subframe structure can be used in a 3GPP 5G wireless communication system. In one aspect, an advanced physical downlink shared channel (xPDSCH) can be scheduled by an advanced physical downlink control channel (xPDCCH) and can be transmitted right after the xPDCCH. A Guard period (GP) can be inserted between the xPDSCH and an advanced physical uplink control channel (xPUCCH) in order to accommodate the DL to UL and UL to DL switching time and round-trip propagation delay. It should be noted that as used herein, "advanced" physical downlink shared channel (xPDSCH) can include 3GPP LTE 4G extended PDSCH, and can include the PDSCH as defined in 3GPP 5G wireless communication system.

Based on the self-contained subframe structure, two options can be considered for DL Hybrid automatic repeat request (HARQ) acknowledgement (ACK/NACK) operations. In a first option, for a scheduling-based HARQ ACK/NACK operation, uplink control information (UCI) can include DL HARQ ACK/NACK feedback for a PDSCH transmission or an xPDCCH indicating a semi-persistent scheduling (SPS) release associated with a serving cell that can be scheduled by an xPDCCH.

Figure 3:
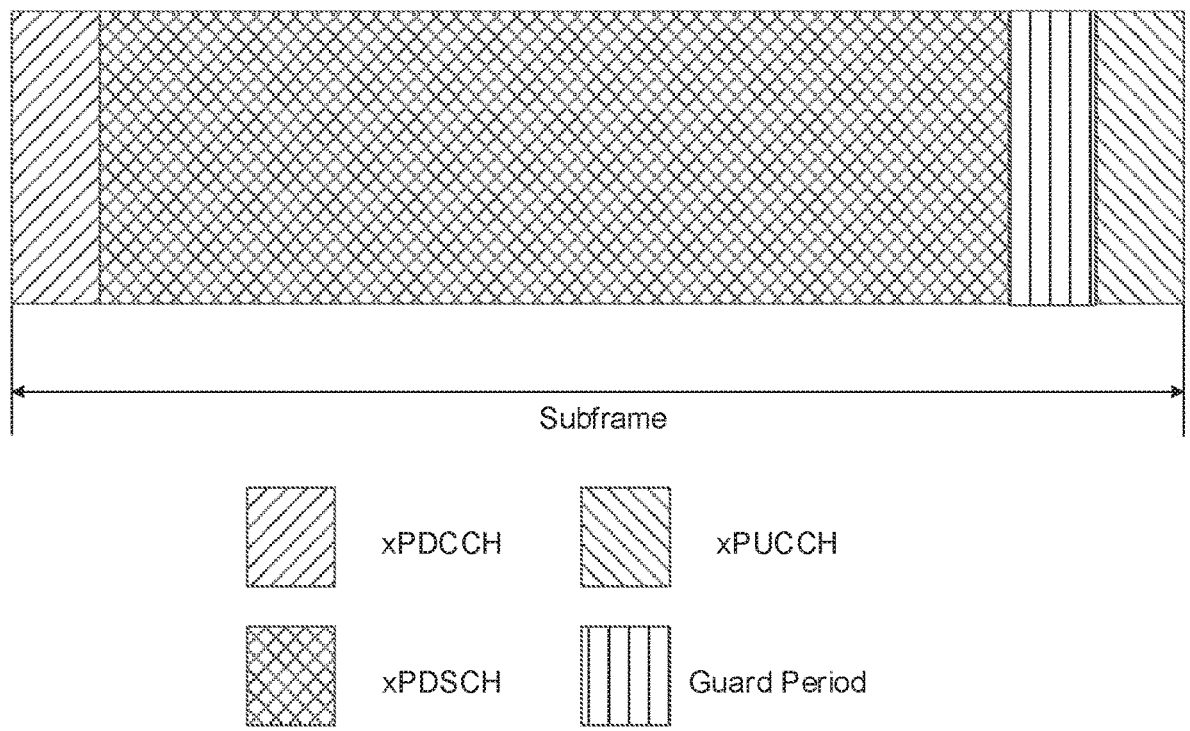
FIG. 3 illustrates a diagram of a self-contained time division duplex (TDD) subframe aggregation in the downlink (DL) in accordance with an example.

In a second option, for a HARQ ACK/NACK operation with a fixed/pre-configured timing, a fixed and/or pre-configured timing relationship can be defined between an xPDSCH transmission and a corresponding HARQ ACK/NACK feedback. For example, a timing relationship can be fixed in the specification and/or can be configured in a semi-static manner via higher layers signaling. In one aspect, a PUCCH can be transmitted in a frequency region on the edges of the system bandwidth. Further, the PUCCH and a physical uplink shared channel (PUSCH) can be multiplexed in a frequency division multiplexing (FDM) manner. However, as depicted in FIG. 3, the xPUCCH and data channel can be multiplexed in a time division multiplexing (TDM) manner for a communication network, such as a 3GPP LTE 5G cellular network.

In one aspect, the present technology provides for an apparatus of a User Equipment (UE), the UE configured to communicate with an eNodeB. The UE can determine, an advanced physical uplink control channel (xPUCCH) resource index for transmission of an advanced physical uplink control channel (xPUCCH); and signal a transceiver of the UE to transmit to the eNodeB uplink (UL) control information (UCI) via the xPUCCH on the xPUCCH resource index. It should be noted that as used herein, "advanced" physical uplink control channel (xPUCCH) can include 3GPP LTE 4G extended PUCCH, and can include the PUCCH as defined in 3GPP 5G wireless communication system.

In one aspect, the present technology provides for an apparatus of a User Equipment (UE), the UE configured to determine the xPUCCH resource for the transmission of UCI (e.g. HARQ ACK/NACK). The UE can provide for a resource value for xPUCCH transmission and a resource determination of the xPUCCH transmission.

In one aspect, the present technology provides for a user equipment (UE) using a self-contained time division duplex (TDD) subframe to communicate with an eNodeB within a wireless communication network is disclosed. The UE can determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof. The UE can signal a transceiver of the UE to transmit to the eNodeB uplink control information (UCI) using the one or more physical resources designated by the xPUCCH resource index.

In one aspect, the present technology provides for a user equipment (UE) using a self-contained time division duplex (TDD) subframe to communicate with an eNodeB within a wireless communication network is disclosed. The UE can determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof. The UE can signal a transceiver of the UE to transmit to the eNodeB uplink control information (UCI) using the one or more physical resources designated by the xPUCCH resource index, wherein the $N_{xPUCCH}^{RB}$ physical resource blocks of the xPUCCH is a number of resource blocks in the xPUCCH and consist of contiguous resource blocks or non-contiguous resource blocks that are distributed across an UL transmission band or a set of resource blocks configured by higher layers.

In one aspect, the present technology provides for an eNodeB to communicate with a user equipment (UE) using a self-contained time division duplex (TDD) subframe within a wireless communication network is disclosed. The eNodeB can signal a transceiver of the eNodeB to transmit to the UE, one or more parameters in downlink control information (DCI) to enable the UE to determine an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof. The eNodeB can process, at the eNodeB, uplink control information (UCI) transmitted by the UE using the one or more physical resources designated by the xPUCCH resource index.

FIG. 1 illustrates a mobile communication network within a cell 100 having an evolved node B (eNB or eNodeB) with a mobile device. FIG. 1 illustrates an eNB 104 that can be associated with an anchor cell, macro cell or primary cell. Also, the cell 100 can include a mobile device, such as, for example, a User Equipment (UE or UEs) 108 that can be in communication with the eNB 104. The eNB 104 can be a station that communicates with the UE 108 and can also be referred to as a base station, a node B, an access point, and the like. In one example, the eNB 104 can be a high transmission power eNB, such as a macro eNB, for coverage and connectivity. The eNB 104 can be responsible for mobility and can also be responsible for radio resource control (RRC) signaling. The UE or UEs 108 can be supported by the macro eNB 104. The eNB 104 can provide communication coverage for a particular geographic area. In 3GPP, the term "cell" can refer to a particular geographic coverage area of eNB and/or an eNB subsystem serving the coverage area with an associated carrier frequency and a frequency bandwidth, depending on the context in which the term is used.

Figure 2:
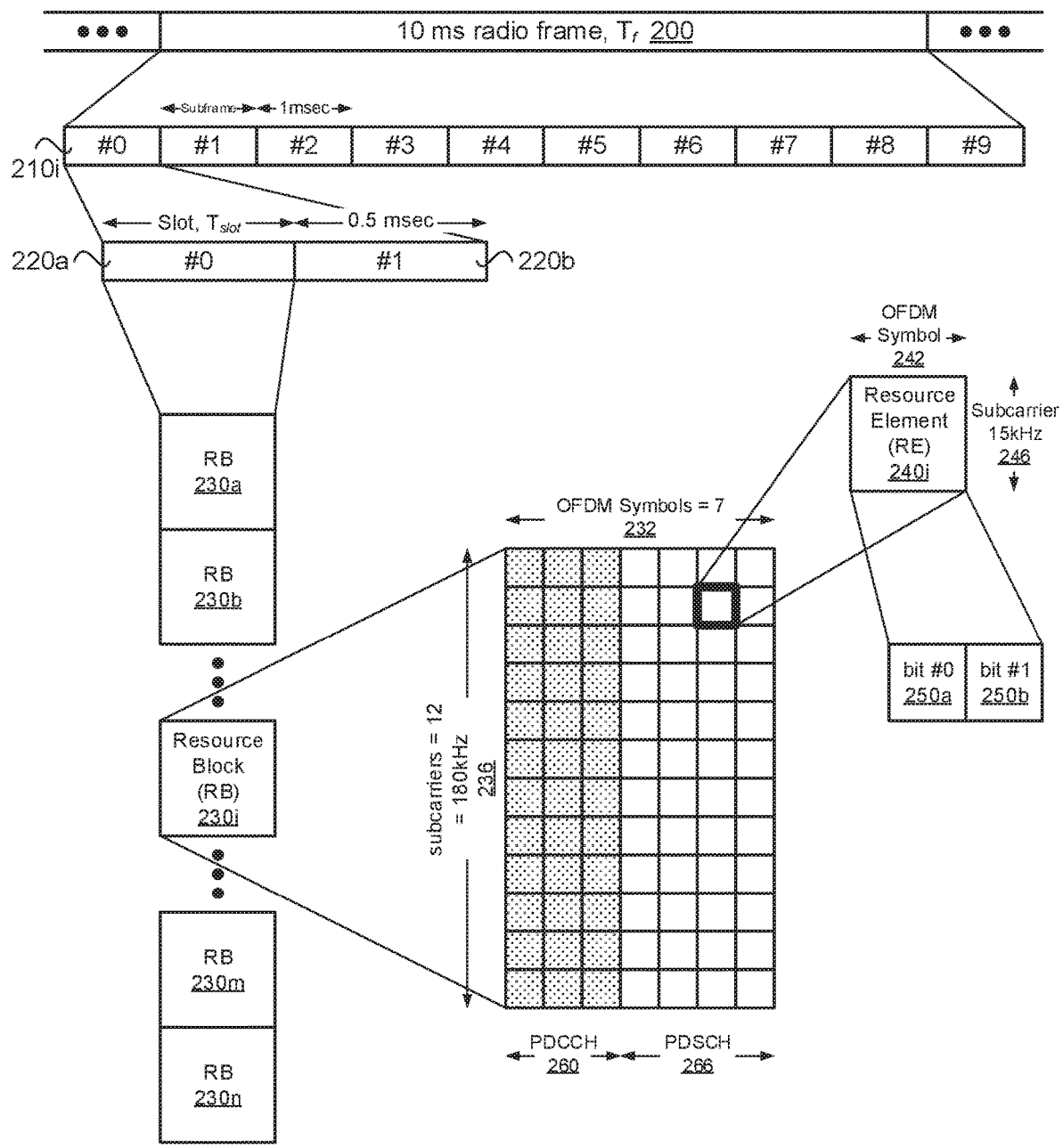
FIG. 2 illustrates a diagram of radio frame resources (e.g., a resource grid) for a downlink (DL) transmission including a physical downlink control channel (PDCCH) in accordance with an example.

FIG. 2 illustrates a legacy 3GPP Rel. 8 diagram of radio frame resources (e.g., a resource grid) for a downlink (DL) transmission including a physical downlink control channel (PDCCH) in accordance with an example. In the example, a radio frame 200 of a signal used to transmit the data can be configured to have a duration, Tf, of 10 milliseconds (ms). Each radio frame can be segmented or divided into ten subframes 210$i$ that are each 1 ms long. Each subframe can be further subdivided into two slots 220$a$ and 220$b$, each with a duration, Tslot, of 0.5 ms. In one example, the first slot (#0) 220a can include a physical downlink control channel (PDCCH) 260 and/or a physical downlink shared channel (PDSCH) 266, and the second slot (#1) 220$b$ can include data transmitted using the PDSCH.

Each slot for a component carrier (CC) used by the node and the wireless device can include multiple resource blocks (RBs) 230$a$, 230$b$, 230$i$, 230$m$, and 230$n$ based on the CC frequency bandwidth. The CC can include a frequency bandwidth and a center frequency within the frequency bandwidth. In one example, a subframe of the CC can include downlink control information (DCI) found in the PDCCH. The PDCCH in the control region can include one to three columns of the first OFDM symbols in a subframe or physical RB (PRB), when a legacy PDCCH is used. The remaining 11 to 13 OFDM symbols (or 14 OFDM symbols, when legacy PDCCH is not used) in the subframe can be allocated to the PDSCH for data (for short or normal cyclic prefix). For example, as used herein, the term 'slot' may be used for 'subframe', or 'transmission time interval (TTI)' can be used for 'frame' or 'frame duration'. In addition, a frame may be considered a user transmission specific quantity (such as a TTI associated with a user and a data flow).

Each RB (physical RB or PRB) 230$i$ can include 12 subcarriers 236 of 15 kHz subcarrier spacing, for a total of 180 kHz per RB (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an advanced cyclic prefix is used. The resource block can be mapped to 84 resource elements (REs) 240$i$ using short or normal cyclic prefixing, or the resource block can be mapped to 72 REs (not shown) using advanced cyclic prefixing. The RE can be a unit of one OFDM symbol 242 by one subcarrier (i.e., 15 kHz) 246.

In the example of FIG. 2, each RE can transmit two bits 250$a$ and 250$b$ of information in the case of quadrature phase-shift keying (QPSK) modulation. Other types of modulation can be used, such as 16 quadrature amplitude modulation (QAM) to transmit 4 bits of information per RE, 64 QAM to transmit 6 bits of information in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Turning now to FIG. 3, an advanced downlink (DL) self-contained time division duplex (TDD) subframe 300 is depicted. That is, FIG. 3 illustrates a self-contained TDD subframe structure in the DL that can be used in a 5G cellular system. The self-contained TDD subframe structure can allow HARQ-ACK transmission to occur in a single subframe, thereby significantly reducing system latency. In one example, the xPDSCH can be scheduled by an advanced physical downlink control channel (xPDCCH) and can be transmitted immediately after the xPDCCH. Following the decoding of the xPDSCH, one or more UEs can feedback the ACK/NACK in an advanced physical uplink control channel (xPUCCH) in a selected section of the subframe, such as in the last section (or part) of the subframe. In one aspect, a guard time (GT) can be inserted between the xPDSCH and the xPUCCH in order to accommodate the DL-to-UL and/or UL-to-DL switching time and round-trip propagation delay.

Physical Resources for xPUCCH Transmission

Figure 4:
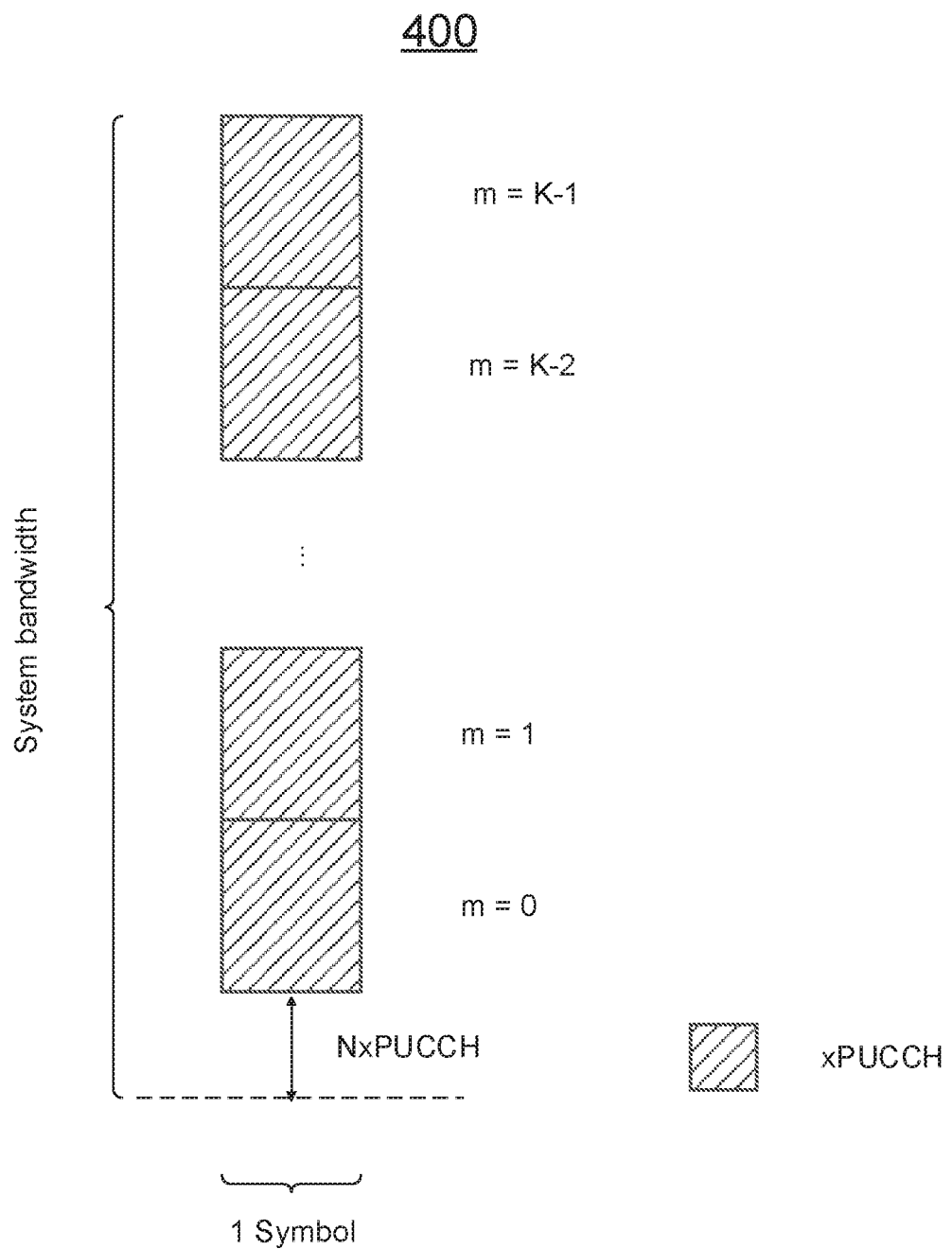
FIG. 4 illustrates a diagram of a resource partition of an advanced physical uplink control channel (xPUCCH) in accordance with an example.

The xPUCCH can support communication with one or more multiple users by sharing one or more xPUCCH resource(s) to maximize the UL spectrum efficiency. In one aspect, xPUCCH transmissions for multiple users can be multiplexed in a frequency division multiplexing (FDM) or code division multiplexing (CDM) fashion or a combination thereof. Turning now to FIG. 4, a diagram 400 of a resource partition of a 5G advanced physical uplink control channel (xPUCCH) is depicted. That is, a resource partition of xPUCCH transmission within one OFDM symbol is illustrated.

In this example, it is assumed that each xPUCCH transmission occupies $N_{xPUCCH}^{RB}$ physical resource blocks. The physical resource blocks of one xPUCCH resource can be contiguous resource blocks or non-contiguous resource blocks distributed across the uplink transmission band or a set of RBs configured by higher layers.

The number of xPUCCH resources in the frequency domain (e.g., "K") can be given by equation:

$$K = \lfloor (N_{RB}^{UL} - N_{xPUCCH}) / N_{xPUCCH}^{RB} \rfloor \quad (1),$$

where $N_{RB}^{UL}$ is the number of resource blocks (RB) in the uplink (e.g. acquired via signaling from a wireless communication network), the $N_{xPUCCH}$ is the starting RB for the xPUCCH transmission, which can be configured by one or more physical or higher layers via an advanced master information block (xMIB) (e.g., a 3GPP LTE 5G xMIB), an advanced system information block (xSIB) (e.g., a 3GPP LTE 5G xSIB), a dedicated radio resource control (RRC) signaling, such as a UE specific dedicated radio resource control (RRC) signalling, a media access control (MAC) control element (CE), and/or a physical layer signaling, such as downlink control information (DCI) formats.

In one example, the $N_{xPUCCH}$ (the starting RB for the xPUCCH transmission) can be defined for each respective xPUCCH format, such as, for example, xPUCCH format 2, which can be used to carry aggregated HARQ ACK/NACK and/or periodic channel state information (CSI) report, and/or a combination of both. That is, xPUCCH format 1 can be constrained to carry scheduling request, 1 or 2 bits HARQ ACK/NACK feedback and /xPUCCH format 2 can carry more information bits, such as greater than 2 bits HARQ ACK/NACK feedback and the CSI report.

Figure 5:
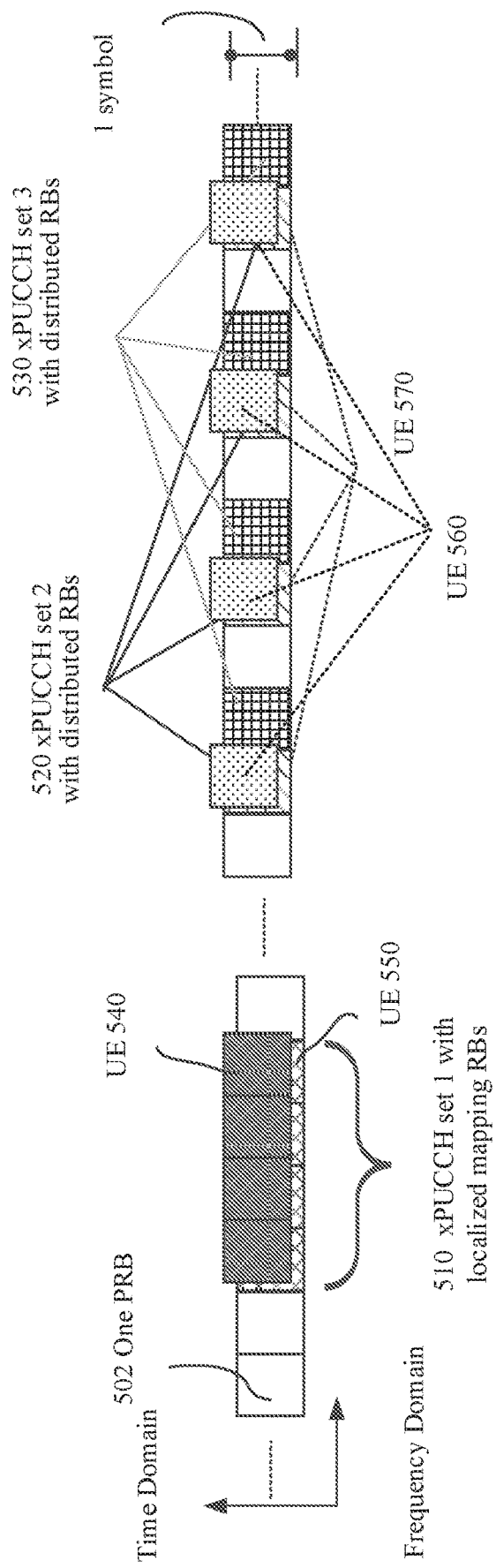
FIG. 5 illustrates a diagram of advanced physical uplink control channel (xPUCCH) resources with localized mapping using consecutive physical resource blocks and distributed mapping in accordance with an example.

Turning now to FIG. 5, block diagram 575 illustrates advanced physical uplink control channel (xPUCCH) resources with localized mapping using consecutive physical resource blocks and distributed mapping. More specifically, FIG. 5 illustrates xPUCCH resource mapping of a wireless communication system (e.g., a 3GPP LTE 5G wireless communication system) using consecutive physical RBs (one physical resource block is depicted as PRB 502) for localized transmission 510 for UE 540 and UE 550; or mapping xPUCCH resources for UE 560 and UE 570 to distributed RBs within an xPUCCH set 520. Also, xPUCCH set 520 and/or xPUCCH set 530 can be distributed sets.

For each serving cell, higher layer signaling can be used to configure an individual UE, such as, for example, UE 540, with one or more xPUCCH sets for xPUCCH transmission. In one aspect, the number of physical resource blocks (PRBs) corresponding to an xPUCCH set can be fixed, predetermined, and/or indicated by higher layers. Each xPUCCH set can be configured to be either a localized xPUCCH transmission or a distributed xPUCCH transmission. xPUCCH sets that are localized and distributed can be fully overlapped, partially overlapped, or non-overlapped.

Different precoding operations may be conducted for localized and distributed xPUCCH sets. For example, each resource element (RE) within the localized set can be applied with a same precoding vector. The precoding vector can either be up to a UE implementation and/or can be indicated by an eNB. Different random precoding vectors can be applied for REs in different PRBs to enable the spatial diversity gain provided by the use of distributed PRBs.

In one aspect, an information field can be included in one or more DCI formats used for a DL assignment to dynamically indicate the xPUCCH set to be used for UCI transmission in a selected or given subframe. In addition, a HARQ-ACK resource offset field can also be present and used in order to effectively use the reserved xPUCCH resources.

In an additional aspect, within one xPUCCH frequency resource, xPUCCH transmission can be multiplexed in a FDM or CDM manner (e.g. UE 560 and UE 570 in FIG. 5) or a combination of both FDM and CDM. In one aspect, for FDM based multiplexing of the xPUCCH transmission, a comb index ($n_{comb}$) can be used to calculate a starting resource element position of the xPUCCH transmission. Similarly, for CDM based multiplexing of the xPUCCH transmission, an orthogonal cover code (OCC) index ($n_{oc}$) can be used to calculate the OCC applied for the xPUCCH transmission.

In one aspect, a resource value for the xPUCCH transmission can be denoted as $n_{xPUCCH}^{(p)}$, where p is the antenna port index, and "n" is the resource value. A frequency resource (m) allocated for the xPUCCH transmission and the orthogonal cover code index ($n_{oc}$) or the comb index ($n_{comb}$) can be determined based on the resource value $n_{xPUCCH}^{(p)}$, where "f( )" is a function:

$$(m, n_{oc}) = f(n_{xPUCCH}^{(p)}) \quad (2),$$

or $$(m, n_{comb}) = f(n_{xPUCCH}^{(p)}) \quad (3).$$

In one aspect, for a CDM based multiplexing scheme within one xPUCCH frequency resource, the frequency resource (m) allocated for the xPUCCH transmission and the orthogonal cover code index ($n_{oc}$) can be given by equation:

$$\begin{cases} m = \lfloor n_{xPUCCH}^{(p)} / N_{SF}^{xPUCCH} \rfloor, m = 0, 1, \cdots, K-1 \\ n_{oc} = n_{xPUCCH}^{(p)} \bmod N_{SF}^{xPUCCH} \end{cases} \quad (4)$$

where mod is a modulo operation, and $N_{SF}^{xPUCCH}$ is a spreading factor within each xPUCCH frequency resource. For example, in the case of length-4 OCC for CDM based) multiplexing scheme $N_{SF}^{xPUCCH}$ can equal 4 (e.g., $N_{SF}^{xPUCCH}=4$).

In one aspect, for FDM based multiplexing scheme within one xPUCCH frequency resource, the frequency resource (m) allocated for the xPUCCH transmission and the comb index ($n_{comb}$) can be given by equation:

$$\begin{cases} m = \lfloor n_{xPUCCH}^{(p)} / N_{SF}^{xPUCCH} \rfloor, m = 0, 1, \cdots, K-1 \\ n_{comb} = n_{xPUCCH}^{(p)} \bmod N_{SF}^{xPUCCH} \end{cases} \quad (5)$$

Resource Determination for xPUCCH Transmission

In one aspect, the present technology provides one or more examples for resource allocation of the xPUCCH transmission. In one aspect, the resource index for the xPUCCH transmission can be semi-statically configured by higher layers. It should be noted that this option may be appropriate for the xPUCCH transmission, which carries periodic information such as channel state information (CSI) report.

In one example, an xPUCCH resource index $n_{xPUCCH}^{(p_0)}$ can be configured for a UE with one antenna port (AP) $p_0$ transmission. For a UE configured for two AP transmissions for xPUCCH, a second xPUCCH resource index $n_{xPUCCH}^{(p_1)}$ can be configured for a second AP, such as AP ($p_1$).

In another aspect, one or more xPUCCH resource indices (e.g., L xPUCCH resource indices, where L can be a positive integer) can be configured for the UE (e.g. by higher layer signaling such as UE specific RRC signaling). Each of the xPUCCH resource indices can include a comb index or an orthogonal cover code index or combination of both. Further, a resource allocation field in downlink control information (DCI) can be used to indicate the xPUCCH resource index out of the more than one xPUCCH resource indices for transmission of the xPUCCH. The subframe index for the xPUCCH transmission can be implicitly determined from the subframe index of the corresponding DCI transmission. Alternatively, an additional field can be used in combination with the said resource allocation field to indicate the xPUCCH resource indices in time as well as frequency and code domains. Note that the same DCI may be used to schedule xPDSCH transmission in the case of HARQ operation with a fixed timing. Alternatively, in the case of scheduling based HARQ operation, the same DCI can be additionally used to schedule the xPUCCH resource which is used to carry DL HARQ ACK/NACK feedback.

Turning now to FIG. 6, a table 600 of advanced physical uplink control channel (xPUCCH) resource values for xPUCCH resource allocation is depicted. More specifically, table 600 illustrates one or more examples indicating an xPUCCH resource value for communication in the DCI when, for example, L=4 (e.g., 4 xPUCCH resource indices). More specifically, the xPUCCH resource allocation field in the DCI can be used to determine the xPUCCH resource value from one of four xPUCCH resource values configured by higher layers according to the mapping defined in Table 600. For a UE configured for two APs for transmission of an xPUCCH, an xPUCCH resource value in DCI formats in table 600 can map to two xPUCCH resources with the first xPUCCH resource $n_{xPUCCH}^{(p_0)}$ for antenna port ($p_0$) and the second xPUCCH resource $n_{xPUCCH}^{(p_1)}$ for antenna port $p_1$. Alternatively, the xPUCCH resource value can map to a single xPUCCH resource $n_{xPUCCH}^{(p_0)}$ for antenna port ($p_0$), and $p_0$ is an antenna port.

In an additional aspect, an xPUCCH resource index can be implicitly derived from at least one of the following parameters (e.g., parameters 1-11). 1) a control channel element (CCE) index. In one example, the xPUCCH resource index can be a lowest CCE index used to schedule the corresponding xPDSCH or xPUCCH transmission. 2) One or more parameters can be used to derive the xPUCCH resource index, such as an OFDM symbol index for the corresponding xPDCCH transmission. 3) One or more parameters can be used to derive the xPUCCH resource index, such as a Demodulation Reference Signal (DM-RS) index or antenna port index used for the corresponding xPDSCH or xPDCCH transmission. 4) One or more parameters can be used to derive the xPUCCH resource index, such as a physical resource block (PRB) index for a corresponding xPDSCH transmission. In one example, the xPUCCH resource index can be a lowest PRB index for the corresponding xPDSCH transmission. 5) One or more parameters can be used to derive the xPUCCH resource index, such as a symbol, slot, subframe, and/or frame index for a corresponding xPDSCH transmission. In one example, the xPUCCH resource index can be a starting OFDM symbol index for the corresponding xPDSCH transmission. 6) One or more parameters can be used to derive the xPUCCH resource index, such as a physical cell identity (ID) and/or virtual cell ID. It should be noted that a virtual cell ID can be provided by higher layers such as an advanced master information block (xMIB), an advanced system information block (xSIB), or a UE specific dedicated radio resource control (RRC) signaling. 7) One or more parameters can be used to derive the xPUCCH resource index, such as a cell specific parameter(s). The cell specific parameter(s) can be signaled by higher layers via xMIB, xSIB or dedicated RRC/MAC CE signalling. 8) One or more parameters can be used to derive the xPUCCH resource index, such as a UE specific parameter(s). The parameter(s) can be signaled by higher layers via UE specific dedicated RRC/MAC CE signalling. 9) One or more parameters can be used to derive the xPUCCH resource index, such as a control channel set index (e.g. in case a UE is configured with one or more control channel sets (e.g. xPDCCH sets)) 10) One or more parameters can be used to derive the xPUCCH resource index, such as an xPUCCH resource index of the first HARQ-ACK response at the start of semi-persistent xPDSCH scheduling, in combination with a predefined rule for the ensuing HARQ-ACK responses, where the predefined rule can be a function of either a cell ID, a subframe index, and/or an SFN. 11) One or more parameters can be used to derive the xPUCCH resource index, such as a UE's Cell Radio Network Temporary Identifier (C-RNTI).

In an additional aspect, the xPUCCH resource index for the xPUCCH transmission can be defined as a function of a lowest CCE index and an OFDM symbol index for the xPDCCH transmission and at least one configured parameter according to equation:

$$n_{xPUCCH}^{(p)} = f(n_{CCE}, I_{sym}, D_{xPUCCH}) \tag{6}$$

where $n_{CCE}$ and $I_{sym}$ are a lowest CCE index and OFDM symbol index for the xPDCCH transmission, respectively, and $D_{xPUCCH}$ is a configured parameter, which can be cell specific or UE specific. For instance, for a UE configured with one AP for xPUCCH transmission, the xPUCCH resource index can be determined according to equation:

$$n_{xPUCCH}^{(p0)} = c_0 \cdot n_{CCE} + c_1 \cdot I_{sym} + c_2 \cdot D_{xPUCCH} \tag{7}$$

where $c_0, c_1, c_2$ are constants, which can be predefined in the specification or configured by higher layers via xMIB, xSIB or RRC signalling, and $p_0$ is an antenna port. In the case when a UE is configured with two APs for xPUCCH transmission, the resource index for antenna port $p_1$ can be determined according to equation:

$$n_{xPUCCH}^{(p1)} = c_0 \cdot n_{CCE} + c_1 \cdot I_{sym} + c_2 \cdot D_{xPUCCH} \times \Delta \tag{8}$$

where $\Delta$ is a constant, e.g., $\Delta=1$.

In another aspect, the xPUCCH resource index for the xPUCCH transmission can be defined as a function of lowest PRB (or PRB Group) index and DM-RS index for the xPDSCH transmission according to equation:

$$n_{xPUCCH}^{(p)} = f(I_{PRB}, n_{DMRS}) \tag{9}$$

where $I_{PRB}$ and $n_{DMRS}$ are the lowest PRB (or PRB Group) index and the DM-RS index for the corresponding xPDSCH transmission, respectively. For instance, for a UE configured with 1 AP for xPUCCH transmission, the resource index can be determined according to equation:

$$n_{xPUCCH}^{(p0)} = b_0 \cdot I_{PRB} + b_1 \cdot n_{DMRS} + b_2 \tag{10}$$

where $b_0, b_1, b_2$ are constants, which can be predefined in the specification or configured by higher layers via xMIB, xSIB or RRC signalling. In the case when UE is configured with two APs for xPUCCH transmission, the resource index for antenna port $p_1$ can be determined according to equation:

$$n_{xPUCCH}^{(p1)} = b_0 \cdot I_{PRB} + b_1 \cdot n_{DMRS} + b_2 + \Delta \tag{11}$$

where $\Delta$ is a constant, e.g., $\Delta=1$.

In an additional aspect, the xPUCCH resource index for the xPUCCH transmission can be defined as a function of physical cell ID or virtual cell ID and UE specific parameter according to equation:

$$n_{xPUCCH}^{(p)} = f(N_{cell}^{ID}, k_{xPUCCH}) \tag{12}$$

where $N_{cell}^{ID}$ is the physical cell ID or virtual cell ID and $k_{xPUCCH}$ is an UE specific parameter which can be configured by UE specific RRC signalling. Note that this option may help to randomize the inter-cell interference. For instance, for UE configured with 1 AP for xPUCCH transmission, the resource index can be determined according to equation:

$$n_{xPUCCH}^{(p0)} = a_0 \cdot N_{cell}^{ID} + a_1 \cdot k_{xPUCCH} + a_2 \tag{13}$$

where $a_0, a_1, a_2$ are constants, which can be predefined in the specification or configured by higher layers via xMIB, xSIB or RRC signalling. In the case when UE is configured with two APs for xPUCCH transmission, the resource index for antenna port $p_1$ can be determined according to equation:

$$n_{xPUCCH}^{(p1)} = a_0 \cdot N_{cell}^{ID} + a_1 \cdot k_{xPUCCH} + a_2 + \Delta \tag{14}$$

where $\Delta$ is a constant, e.g., $\Delta=1$.

In one aspect, the resource allocated for the xPUCCH transmission can be explicitly signaled in a downlink control information (DCI). Given that the UCI carried by xPUCCH can be transmitted in one symbol, resource allocation with frequency dependent scheduling can be employed to improve the link budget. It should be noted that the DCI can be used to schedule the xPDSCH transmission or to schedule the xPUCCH which is used to carry DL HARQ ACK/NACK feedback.

In one aspect, for a configuration of two sets of xPUCCH resources, the DCI format can be used to signal one set index from the two sets of xPUCCH resources (e.g. based on UE feedback statistic or uplink measurement conducted by eNB). The exact xPUCCH resource within the indicated xPUCCH set may be either implicitly mapped and/or explicitly indicated by means of other fields in the same DCI formats. The design consideration can be that the set of distributed mapping can be potentially served as a fallback option for localized xPUCCH transmission due to more reliable property.

In one aspect, a xPUCCH resource index $n_{xPUCCH}^{(p)}$ can be signaled in the DCI. More specifically, an xPUCCH resource index $n_{xPUCCH}^{(p_0)}$ can be configured for a UE with one antenna port (AP) $p_0$. For a UE configured for two AP transmission for xPUCCH, an additional xPUCCH resource index $n_{xPUCCH}^{(p_1)}$ can be configured for AP ($p_1$).

In an additional aspect, resource allocation for the xPUCCH transmission can follow a physical uplink shared channel (PUSCH) resource allocation type 0 as defined in 3GPP LTE Rel. 12. That is, the resource allocation can be included in an xPDSCH grant DCI and/or included in a separate DCI dedicated for signaling the xPUCCH resource.

Figure 7:
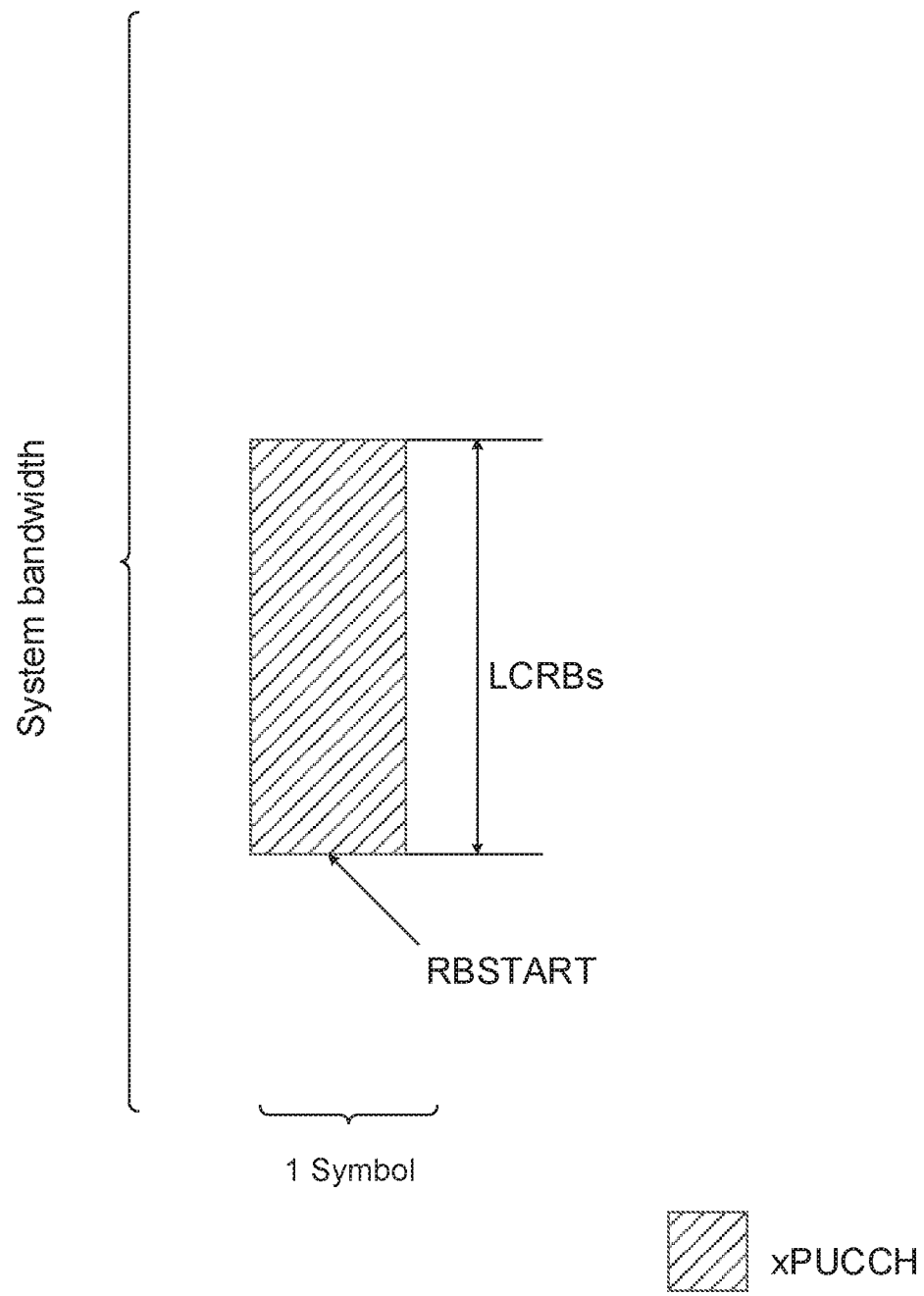
FIG. 7 illustrates a diagram of resource allocation for an advanced physical uplink control channel (xPUCCH) transmission in accordance with an example.

Turning now to FIG. 7, a diagram 700 of resource allocation for an advanced physical uplink control channel (xPUCCH) transmission is illustrated. As shown in FIG. 7, a resource allocation field in the scheduling grant for the transmission of xPUCCH consists of a resource indication value (RIV) corresponding to a starting resource block ($RB_{START}$) and a length in terms of contiguously allocated resource blocks ($L_{CRBs} \geq 1$). The resource indication value can be defined according to the following "if, else" equation:

if $(L_{CRBs}-1) \leq \lfloor N_{RB}^{UL}/2 \rfloor$, then $$RIV = N_{RB}^{UL}(L_{CRBs}-1) + RB_{START}$$

else $$RIV = N_{RB}^{UL}(N_{RB}^{UL}-L_{CRBs}+1) + (N_{RB}^{UL}-1-RB_{START}) \quad (15),$$

where $N_{RB}^{UL}$ is a number of resource blocks (RB) in the uplink.

In one aspect, resource allocation for the xPUCCH transmission can follow a PUSCH resource allocation type 1 as defined in as defined in 3GPP LTE Rel. 12.

In an additional aspect, a length for the transmission of xPUCCH or the number of RBs of xPUCCH can be predefined, which can lead to reduced signalling overhead. The resource allocation field in the scheduling grant for the transmission of xPUCCH can consist of a starting resource block ($RB_{START}$) only.

In one aspect, a minimum resource allocation granularity (resource block group) for the transmission of xPUCCH can be predefined and/or configured. More specifically, one resource block group can occupy M resource blocks, where M is a positive integer. The resource allocation field in the scheduling grant for the transmission of xPUCCH can consist of a starting resource block group ($RBG_{START}$).

As an additional aspect, the length of the xPUCCH transmission can also be included in the scheduling grant. To reduce the signalling overhead, a limited set of xPUCCH transmission length can be predefined. For instance, the xPUCCH transmission length set can be defined as {1M, 2M, 4M, 8M}.

FIG. 8 illustrates a table 800 of an advanced physical uplink control channel (xPUCCH) resource values for xPUCCH resource. As illustrated in FIG. 8, a two bit field can be included in the scheduling grant to indicate the xPUCCH length. Alternatively, a length of the xPUCCH transmission can be derived from the xPDCCH transmission, which can be used to schedule the corresponding xPUCCH transmission. In one aspect, a length of the xPUCCH transmission can be defined as a function of aggregation level used for the xPDCCH transmission according to equation:

$$L_{xPUCCH} = f(AL_{xPDCCH}) \quad (16),$$

For instance, a length of the xPUCCH transmission can be given according to equation:

$$L_{xPUCCH} = Q \cdot AL_{xPDCCH} \quad (16),$$

where $AL_{xPDCCH}$ is the aggregation level used for the xPDCCH transmission which carries the scheduling grant of xPUCCH transmission, Q is a constant (e.g., Q=1), which can be predefined and/or configured by higher layers via xMIB, xSIB, and/or RRC signalling.

Further, a hashing function can be defined for a UE to determine the frequency resource for the transmission of xPUCCH. More specifically, a hashing function can be defined as a function of C-RNTI, slot, and/or subframe index. In one aspect, a hashing function, as defined for a physical downlink control channel (PDCCH) UE specific search space in 3GPP LTE, can be reused according to equation:

$$m_k = (A \cdot m_{k-1}) \bmod D \quad (17),$$

where $m_{-1} = n_{RNTI} \neq 0$, A=39827, D=65537 and $k = \lfloor n_s/2 \rfloor$, $n_s$ is slot number within a radio frame. $n_{RNTI}$ can be the C-RNTI, and $m_k$ can be the frequency resource for the xPUCCH transmission in $k_{th}$ subframe.

It should be noted that in the above options, a comb index ($n_{comb}$) and/or orthogonal cover code index ($n_{oc}$) can be explicitly indicated in the DCI which carries the scheduling grant of xPUCCH transmission or configured by higher layers via UE specific dedicated RRC signalling.

In another aspect, to further reduce the control signalling overhead, a starting resource block of the xPUCCH transmission can be the same as the lowest or the highest index PRB that used for the transmission of associated xPDSCH, wherein the xPUCCH can be used to carry the HARQ ACK/NACK feedback for the corresponding xPDSCH transmission.

It should be noted that this is primarily due to the fact that for frequency dependent scheduling, an eNB can allocate the resource for the xPDSCH transmission with best channel quality. Under the assumption of DL and UL channel reciprocity in the TDD system, the resource allocated for the xPUCCH transmission can also have good channel quality on the assigned PRBs for xPDSCH transmission.

Similarly, a starting resource block of the xPUCCH transmission can be the same as a lowest or highest index PRB that is used for the transmission of xPDCCH. It should be noted that the xPDCCH can be used to schedule the corresponding xPDSCH transmission or to schedule the xPUCCH which is used to carry DL HARQ ACK/NACK feedback.

Figure 9:
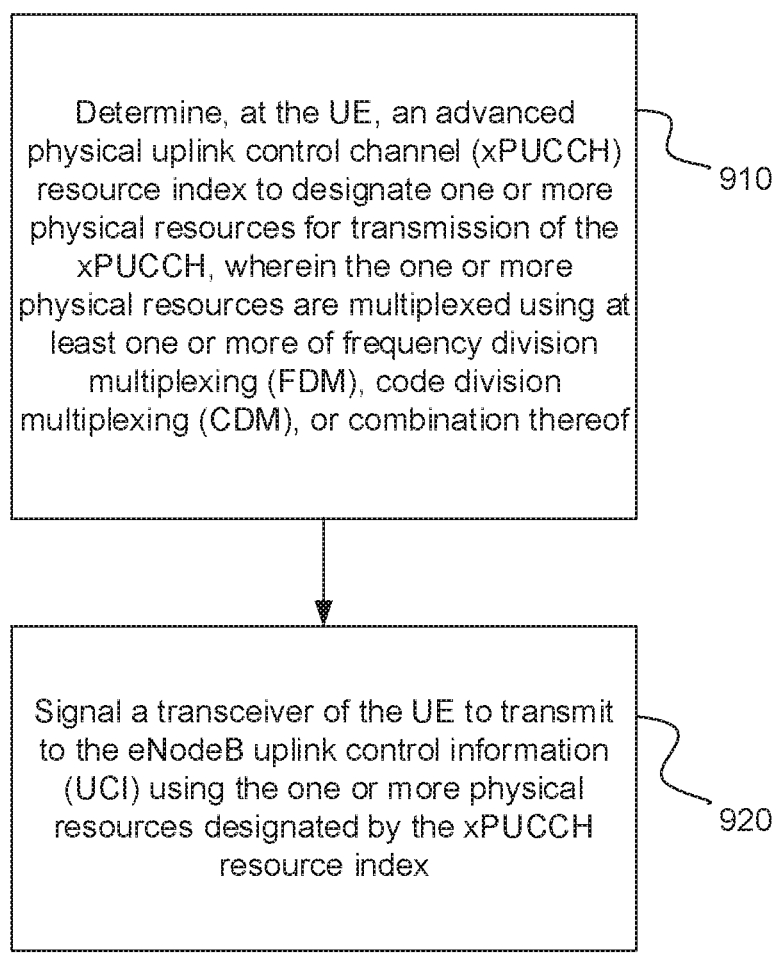
FIG. 9 depicts additional functionality of a user equipment (UE) operable to communicate with an eNodeB, within a wireless communication network, using a self-contained time division duplex (TDD) subframe.

Turning now to FIG. 9, an example provides functionality 900 of a User Equipment (UE), as shown in the flow chart in FIG. 9. The functionality 900 can be implemented as a method or the functionality can be executed as instructions on a machine, where the instructions are included one or more computer readable mediums or one or more non-transitory machine readable storage mediums. The UE can comprise one or more processors and memory configured to: determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof, as in block 910. The UE can comprise one or more processors and memory configured to: signal a transceiver of the UE to transmit to the eNodeB uplink control information (UCI) using the one or more physical resources designated by the xPUCCH resource index, as in block 920.

Figure 10:
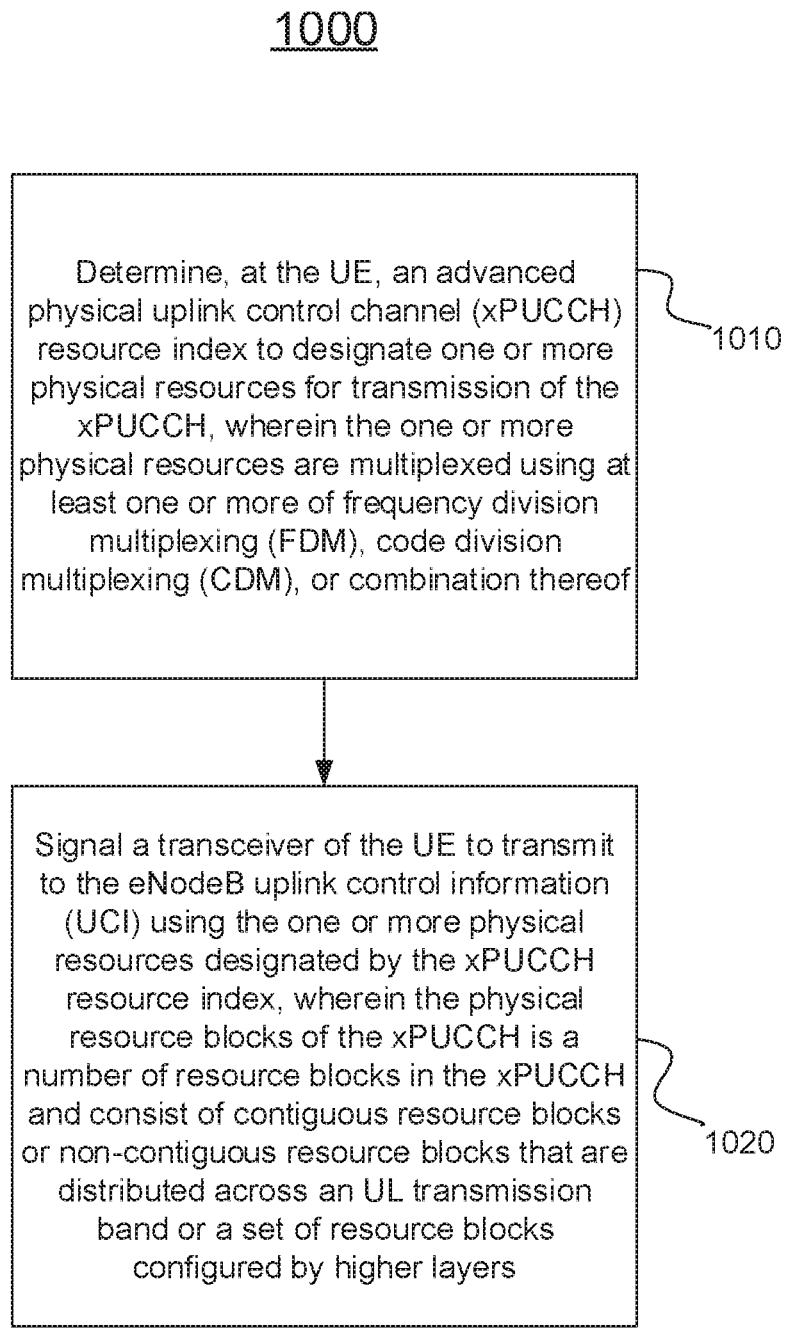
FIG. 10 depicts functionality of a user equipment (UE) to communicate with an eNodeB, within a wireless communication network, using a self-contained time division duplex (TDD) subframe in accordance with an example.

Another example provides functionality 1000 of a user equipment (UE) operable to communicate with an eNodeB using a self-contained time division duplex (TDD) subframe, as shown in the flow chart in FIG. 10. The functionality 1000 can be implemented as a method or the functionality can be executed as instructions on a machine, where the instructions are included one or more computer readable mediums or one or more non-transitory machine readable storage mediums. The UE can comprise one or more processors and memory configured to: determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof, as in block 1010. The UE can comprise one or more processors and memory configured to: signal a transceiver of the UE to transmit to the eNodeB uplink control information (UCI) using the one or more physical resources designated by the xPUCCH resource index, wherein the $N_{xPUCCH}^{RB}$ physical resource blocks of the xPUCCH is a number of resource blocks in the xPUCCH and consist of contiguous resource blocks or non-contiguous resource blocks that are distributed across an UL transmission band or a set of resource blocks configured by higher layers, as in block 1020.

Figure 11:
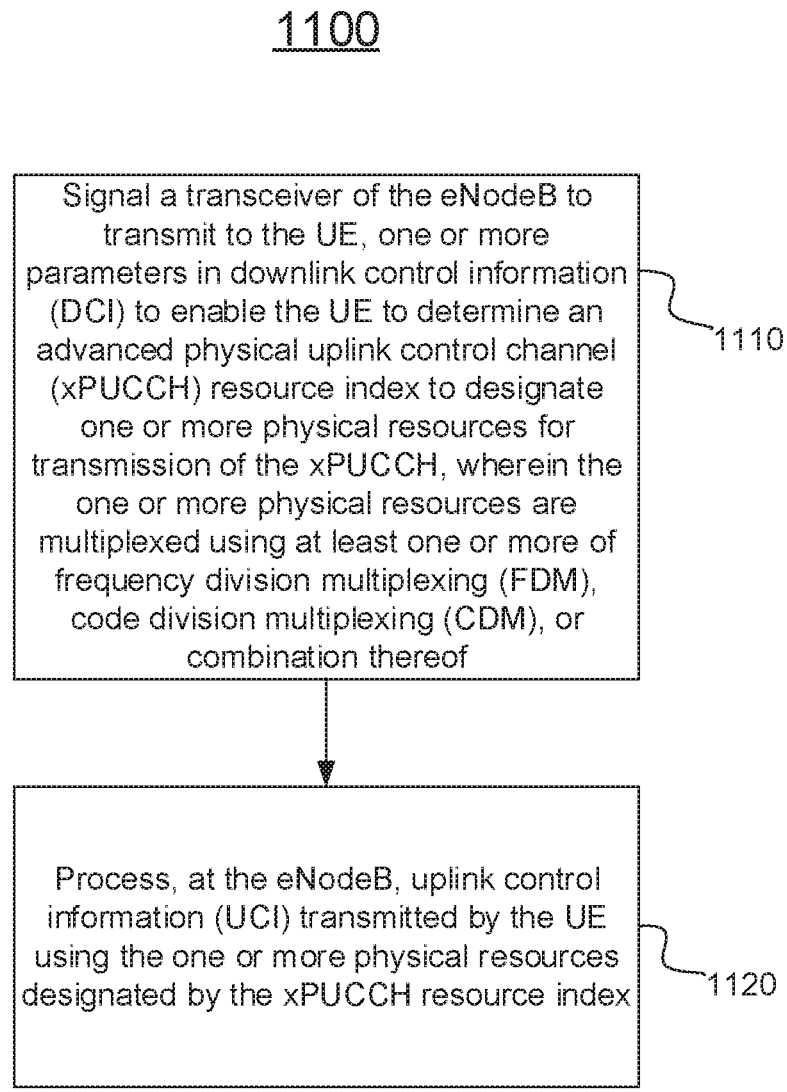
FIG. 11 depicts additional functionality of an eNodeB operable to communicate with a User Equipment (UE), within a wireless communication network, using a self-contained time division duplex (TDD) subframe.

Another example provides functionality 1100 of an eNodeB operable to communicate with a User Equipment (UE) using a self-contained time division duplex (TDD) subframe, as shown in the flow chart in FIG. 11. The functionality 1100 can be implemented as a method or the functionality can be executed as instructions on a machine, where the instructions are included one or more computer readable mediums or one or more non-transitory machine readable storage mediums. The eNodeB can comprise one or more processors and memory configured to: signal a transceiver of the eNodeB to transmit to the UE, one or more parameters in downlink control information (DCI) to enable the UE to determine an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof, as in block 1110. The eNodeB can comprise one or more processors and memory configured to: process, at the eNodeB, uplink control information (UCI) transmitted by the UE using the one or more physical resources designated by the xPUCCH resource index, as in block 1120.

Figure 12:
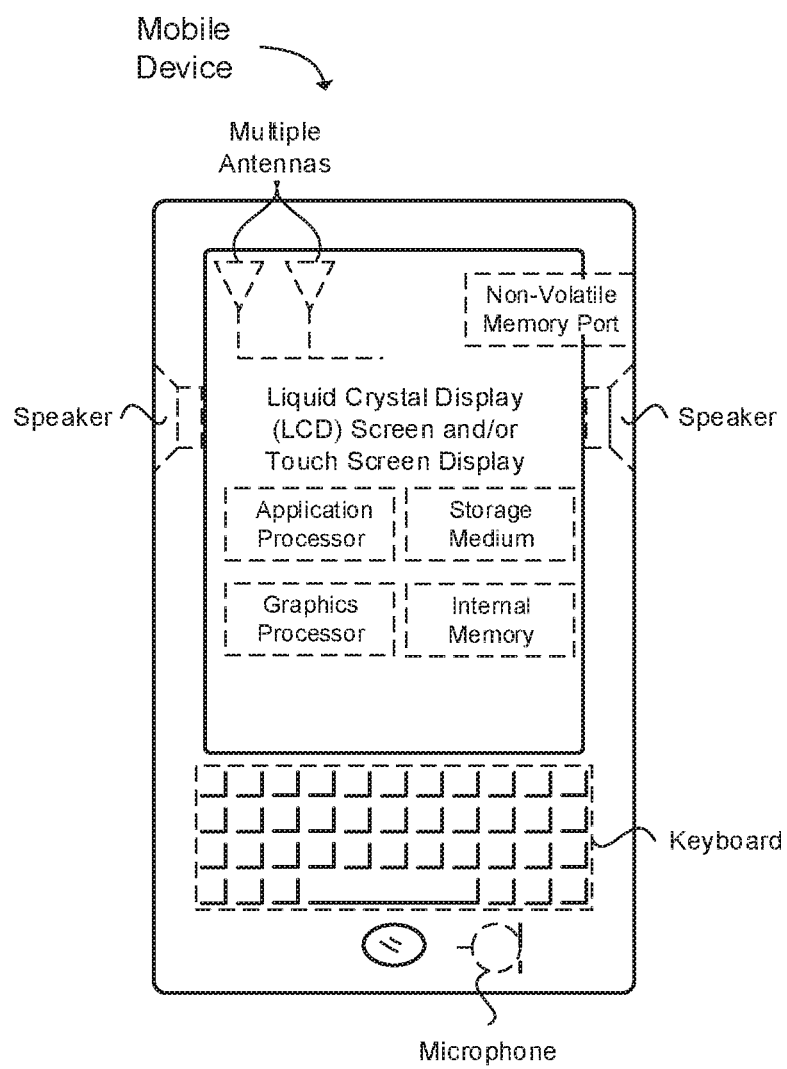
FIG. 12 illustrates a diagram of example components of a wireless device (e.g. User Equipment "UE") device in accordance with an example.

FIG. 12 illustrates a diagram of a wireless device (e.g., UE) in accordance with an example. FIG. 12 provides an example illustration of the wireless device, such as a user equipment (UE) UE, a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

Figure 13:
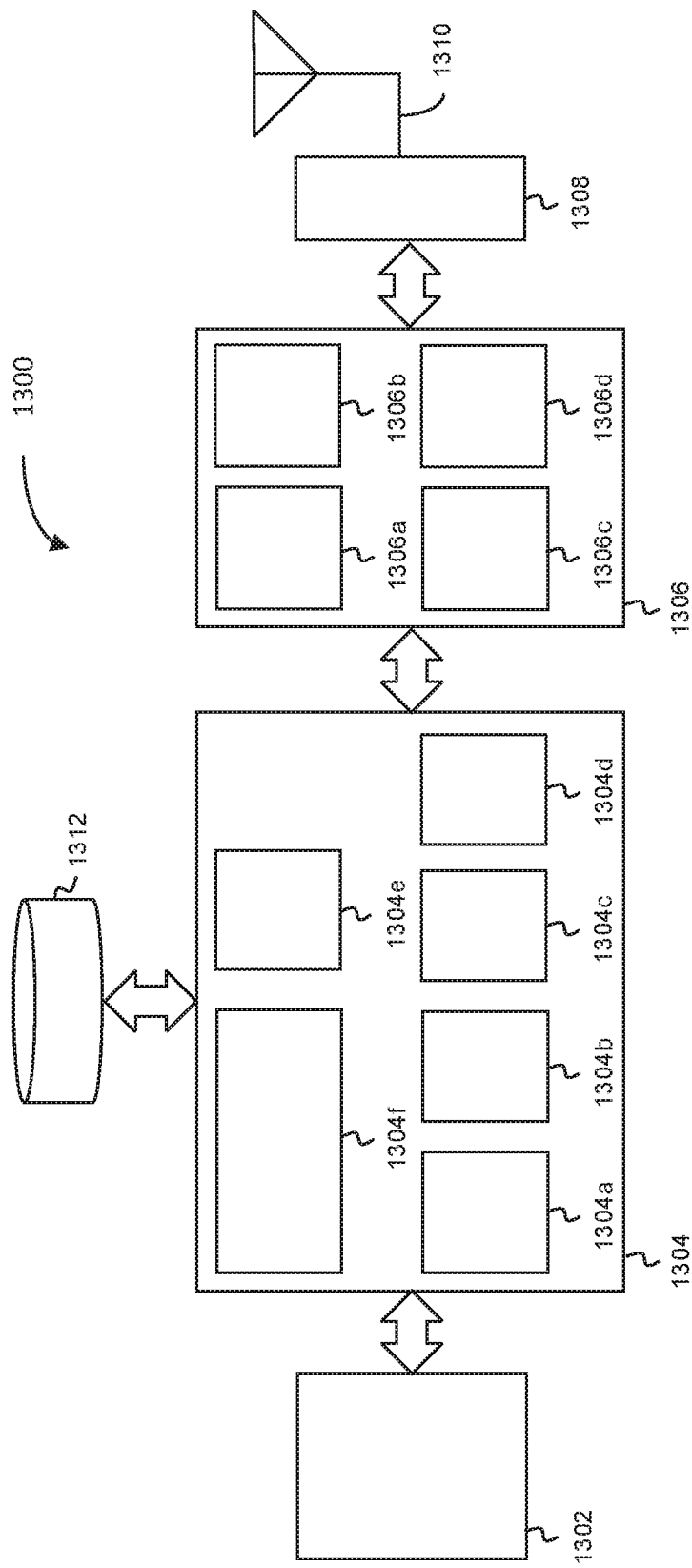
FIG. 13 illustrates a diagram of example components of a User Equipment (UE) device in accordance with an example.

FIG. 13 illustrates a diagram of example components of a User Equipment (UE) device in accordance with an example. FIG. 13 illustrates, for one aspect, example components of a User Equipment (UE) device 1300. In some aspects, the UE device 1300 can include application circuitry 1302, baseband circuitry 1304, Radio Frequency (RF) circuitry 1306, front-end module (FEM) circuitry 1308 and one or more antennas 1310, coupled together at least as shown.

The application circuitry 1302 can include one or more application processors. For example, the application circuitry 1302 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The processor(s) can include any combination of general-purpose processors and dedicated processors (e.g., graphics processors, application processors, etc.). The processors can be coupled with and/or can include a storage medium 1312, and can be configured to execute instructions stored in the storage medium 1312 to enable various applications and/or operating systems to run on the system.

The baseband circuitry 1304 can include circuitry such as, but not limited to, one or more single-core or multi-core processors. The baseband circuitry 1304 can include one or more baseband processors and/or control logic to process baseband signals received from a receive signal path of the RF circuitry 1306 and to generate baseband signals for a transmit signal path of the RF circuitry 1306. Baseband processing circuitry 1304 can interface with the application circuitry 1302 for generation and processing of the baseband signals and for controlling operations of the RF circuitry 1306. For example, in some aspects, the baseband circuitry 1304 can include a second generation (2G) baseband processor 1304a, third generation (3G) baseband processor 1304b, fourth generation (4G) baseband processor 1304c, and/or other baseband processor(s) 1304d for other existing generations, generations in development or to be developed in the future (e.g., fifth generation (5G), 6G, etc.). The baseband circuitry 1304 (e.g., one or more of baseband processors 1304a-d) can handle various radio control functions that enable communication with one or more radio networks via the RF circuitry 1306. The radio control functions can include, but are not limited to, signal modulation/demodulation, encoding/decoding, radio frequency shifting, etc. In some aspects, modulation/demodulation circuitry of the baseband circuitry 1304 can include Fast-Fourier Transform (FFT), precoding, and/or constellation mapping/demapping functionality. In some aspects, encoding/decoding circuitry of the baseband circuitry 1304 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1304 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1304e of the baseband circuitry 1304 can be configured to run elements of the protocol stack for signaling of the PHY, MAC, RLC, PDCP and/or RRC layers. In some aspects, the baseband circuitry can include one or more audio digital signal processor(s) (DSP) 1304f. The audio DSP(s) 1304f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1304 and the application circuitry 1302 can be implemented together such as, for example, on a system on a chip (SOC).

In some aspects, the baseband circuitry 1304 can provide for communication compatible with one or more radio technologies. For example, in some aspects, the baseband circuitry 1304 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1304 is configured to support radio communications of more than one wireless protocol can be referred to as multi-mode baseband circuitry.

RF circuitry 1306 can enable communication with wireless networks using modulated electromagnetic radiation through a non-solid medium. In various aspects, the RF circuitry 1306 can include switches, filters, amplifiers, etc. to facilitate the communication with the wireless network. RF circuitry 1306 can include a receive signal path which can include circuitry to down-convert RF signals received from the FEM circuitry 1308 and provide baseband signals to the baseband circuitry 1304. RF circuitry 1306 can also include a transmit signal path which can include circuitry to up-convert baseband signals provided by the baseband circuitry 1304 and provide RF output signals to the FEM circuitry 1308 for transmission.

In some aspects, the RF circuitry 1306 can include a receive signal path and a transmit signal path. The receive signal path of the RF circuitry 1306 can include mixer circuitry 1306a, amplifier circuitry 1306b and filter circuitry 1306c. The transmit signal path of the RF circuitry 1306 can include filter circuitry 1306c and mixer circuitry 1306a. RF circuitry 1306 can also include synthesizer circuitry 1306d for synthesizing a frequency for use by the mixer circuitry 1306a of the receive signal path and the transmit signal path. In some aspects, the mixer circuitry 1306a of the receive signal path can be configured to down-convert RF signals received from the FEM circuitry 1308 based on the synthesized frequency provided by synthesizer circuitry 1306d. The amplifier circuitry 1306b can be configured to amplify the down-converted signals and the filter circuitry 1306c can be a low-pass filter (LPF) or band-pass filter (BPF) configured to remove unwanted signals from the down-converted signals to generate output baseband signals. Output baseband signals can be provided to the baseband circuitry 1304 for further processing. In some aspects, the output baseband signals can be zero-frequency baseband signals, although the output baseband signals do not have to be zero-frequency baseband signals. In some aspects, mixer circuitry 1306a of the receive signal path can comprise passive mixers, although the scope of the aspects is not limited in this respect.

In some aspects, the mixer circuitry 1306a of the transmit signal path can be configured to up-convert input baseband signals based on the synthesized frequency provided by the synthesizer circuitry 1306d to generate RF output signals for the FEM circuitry 1308. The baseband signals can be provided by the baseband circuitry 1304 and can be filtered by filter circuitry 1306c. The filter circuitry 1306c can include a low-pass filter (LPF), although the scope of the aspects is not limited in this respect.

In some aspects, the mixer circuitry 1306a of the receive signal path and the mixer circuitry 1306a of the transmit signal path can include two or more mixers and can be arranged for quadrature downconversion and/or upconversion respectively. In some aspects, the mixer circuitry 1306a of the receive signal path and the mixer circuitry 1306a of the transmit signal path can include two or more mixers and can be arranged for image rejection (e.g., Hartley image rejection). In some aspects, the mixer circuitry 1306a of the receive signal path and the mixer circuitry 1306a can be arranged for direct downconversion and/or direct upconversion, respectively. In some aspects, the mixer circuitry 1306a of the receive signal path and the mixer circuitry 1306a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1306 can include analog-to-digital converter (ADC) and digital-to-analog converter (DAC) circuitry and the baseband circuitry 1304 can include a digital baseband interface to communicate with the RF circuitry 1306.

In some dual-mode embodiments, a separate radio IC circuitry can be provided for processing signals for each spectrum, although the scope of the embodiments is not limited in this respect.

In some embodiments, the synthesizer circuitry 1306d can be a fractional-N synthesizer or a fractional N/N+1 synthesizer, although the scope of the embodiments is not limited in this respect as other types of frequency synthesizers can be suitable. For example, synthesizer circuitry 1306d can be a delta-sigma synthesizer, a frequency multiplier, or a synthesizer comprising a phase-locked loop with a frequency divider.

The synthesizer circuitry 1306d can be configured to synthesize an output frequency for use by the mixer circuitry 1306a of the RF circuitry 1306 based on a frequency input and a divider control input. In some embodiments, the synthesizer circuitry 1306d can be a fractional N/N+1 synthesizer.

In some embodiments, frequency input can be provided by a voltage controlled oscillator (VCO), although that is not a constraint. Divider control input can be provided by either the baseband circuitry 1304 or the applications processor 1302 depending on the desired output frequency. In some embodiments, a divider control input (e.g., N) can be determined from a look-up table based on a channel indicated by the applications processor 1302.

Synthesizer circuitry 1306d of the RF circuitry 1306 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1306 can include an IQ/polar converter.

FEM circuitry 1308 can include a receive signal path which can include circuitry configured to operate on RF signals received from one or more antennas 1310, amplify the received signals and provide the amplified versions of the received signals to the RF circuitry 1306 for further processing. FEM circuitry 1308 can also include a transmit signal path which can include circuitry configured to amplify signals for transmission provided by the RF circuitry 1306 for transmission by one or more of the one or more antennas 1310.

In some embodiments, the FEM circuitry 1308 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1306). The transmit signal path of the FEM circuitry 1308 can include a power amplifier (PA) to amplify input RF signals (e.g., provided by RF circuitry 1306), and one or more filters to generate RF signals for subsequent transmission (e.g., by one or more of the one or more antennas 1310.

In some embodiments, the UE device 1300 can include additional elements such as, for example, memory/storage, display, camera, sensor, and/or input/output (I/O) interface.

Figure 14:
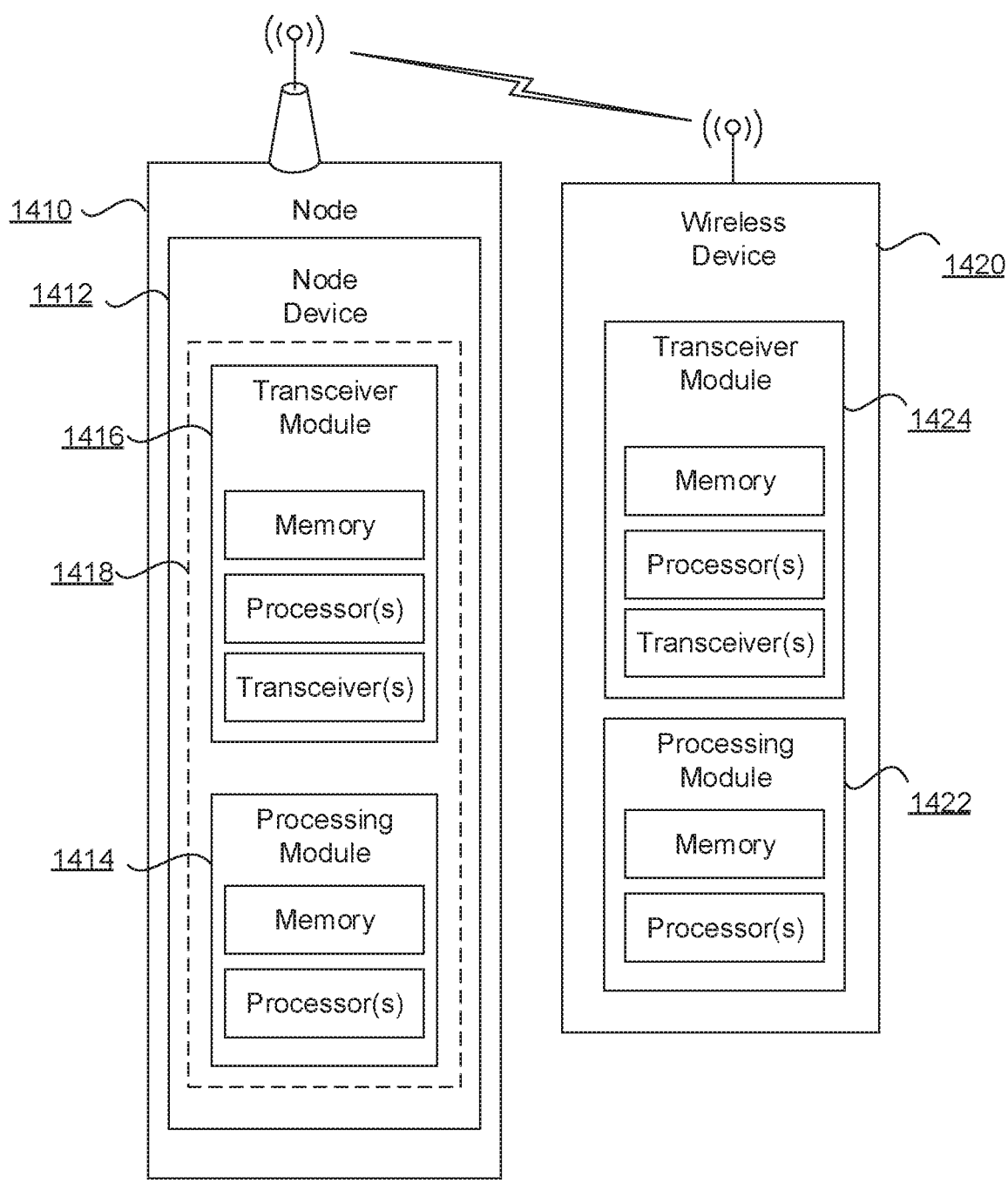
FIG. 14 illustrates a diagram of a node (e.g., eNB) and wireless device (e.g., UE) in accordance with an example.

FIG. 14 illustrates a diagram 1400 of a node 1410 (e.g., eNB and/or a base station) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1410 can include a node device 1412. The node device 1412 or the node 1410 can be configured to communicate with the wireless device 1420. The node device 1412 can be configured to implement the technology described. The node device 1412 can include a processing module 1414 and a transceiver module 1416. In one aspect, the node device 1412 can include the transceiver module 1416 and the processing module 1414 forming a circuitry 1418 for the node 1410. In one aspect, the transceiver module 1416 and the processing module 1414 can form a circuitry of the node device 1412. The processing module 1414 can include one or more processors and memory. In one embodiment, the processing module 1422 can include one or more application processors. The transceiver module 1416 can include a transceiver and one or more processors and memory. In one embodiment, the transceiver module 1416 can include a baseband processor.

The wireless device 1420 can include a transceiver module 1424 and a processing module 1422. The processing module 1422 can include one or more processors and memory. In one embodiment, the processing module 1422 can include one or more application processors. The transceiver module 1424 can include a transceiver and one or more processors and memory. In one embodiment, the transceiver module 1424 can include a baseband processor. The wireless device 1420 can be configured to implement the technology described. The node 1410 and the wireless devices 1420 can also include one or more storage mediums, such as the transceiver module 1416, 1424 and/or the processing module 1414, 1422. In one aspect, the components described herein of the transceiver module 1416 can be included in one or more separate devices that can be used in a cloud-RAN (C-RAN) environment.

EXAMPLES

The following examples pertain to specific embodiments and point out specific features, elements, or steps that can be used or otherwise combined in achieving such embodiments.

Example 1 includes an apparatus of a User Equipment (UE), the UE configured to communicate with an eNodeB, the apparatus comprising one or more processors and memory configured to: determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof; and signal a transceiver of the UE to transmit to the eNodeB uplink control information (UCI) using the one or more physical resources designated by the xPUCCH resource index.

Example 2 includes the apparatus of example 1, wherein each xPUCCH transmission occupies $N_{xPUCCH}^{RB}$ physical resource blocks, wherein the $N_{xPUCCH}^{RB}$ physical resource blocks of the xPUCCH is a number of resource blocks in the xPUCCH and consist of contiguous resource blocks or non-contiguous resource blocks that are distributed across an UL transmission band or a set of resource blocks configured by higher layers.

Example 3 includes the apparatus of example 1, wherein the one or more processors and memory are further configured to: define a resource value for the xPUCCH transmission as $N_{xPUCCH}^{(p)}$, where P is an antenna port index, wherein the resource value is the xPUCCH resource index; or determine, according to the resource value, a frequency resource allocated for the xPUCCH transmission, an orthogonal cover code index ($n_{oc}$). a comb index ($n_{comb}$), or a combination thereof.

Example 4 includes the apparatus of example 1 or 3, wherein the one or more processors and memory are further configured to: multiplex the xPUCCH transmission within one xPUCCH frequency resource using code division multiplexing (CDM), wherein the frequency resource allocated for the xPUCCH transmission and the orthogonal cover code index ($n_{oc}$) is defined as:

$$\begin{cases} m = \lfloor n_{xPUCCH}^{(p)} / N_{SF}^{xPUCCH} \rfloor, m = 0, 1, \cdots, K-1 \\ n_{oc} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource; or multiplex the xPUCCH transmission within one xPUCCH frequency resource using frequency division multiplexing (FDM), wherein the frequency resource allocated for the xPUCCH transmission and the comb index ($n_{comb}$) is defined as:

$$\begin{cases} m = \lfloor n_{xPUCCH}^{(p)} / N_{SF}^{xPUCCH} \rfloor, m = 0, 1, \ldots, K-1 \\ n_{comb} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource.

Example 5 includes the apparatus of example 1 or 3, wherein the resource value of $n_{xPUCCH}^{(p)}$ for transmitting the xPUCCH is semi-statically configure by one or more higher layers.

Example 6 includes the apparatus of example 1, wherein the one or more processors and memory are further configured to: configure one or more xPUCCH resource indices by higher layer signaling via UE specific radio resource control (RRC) signaling; wherein a resource allocation field in downlink control information (DCI) is used to indicate the xPUCCH resource index out of the one or more xPUCCH resource indices for transmission of the xPUCCH.

Example 7 includes the apparatus of example 6, wherein a subframe index for the xPUCCH transmission is determined from a subframe index of a corresponding DCI transmission; wherein an additional field is used in combination with the resource allocation field to indicate the one or more xPUCCH resource indices in one of a Time-Division Duplex (TDD) domain, frequency division duplex (FDD) domain, code domain, or combination thereof.

Example 8 includes the apparatus of example 1, wherein the xPUCCH resource index is derived from at least one of a plurality of parameters, wherein the plurality of parameters include at least one of a control channel element (CCE) index, a orthogonal frequency-division multiplexing (OFDM) symbol index for a corresponding xPDCCH transmission, a Demodulation Reference Signal (DM-RS) index, an antenna port index used for a corresponding advanced physical downlink shared channel (xPDSCH) or the corresponding xPDCCH transmission, a physical resource block (PRB) index for the corresponding xPDSCH transmission, a subframe index for the corresponding xPDSCH transmission, a physical cell identity (ID), a virtual cell ID, cell specific parameters, UE specific parameters, a control channel set index, an xPUCCH resource index of a first HARQ-ACK response at a start of semi-persistent xPDSCH scheduling, and a Cell Radio Network Temporary Identifier (C-RNTI) of the UE.

Example 9 includes the apparatus of example 1 or 8, wherein the one or more processors and memory are further configured to: determine the xPUCCH transmission, for the UE that is configured with one antenna port for transmitting the xPUCCH, according to equation: $n_{xPUCCH}^{(p0)} = c_0 \cdot n_{CCE} + c_1 \cdot I_{sym} + c_2 \cdot D_{xPUCCH}$, where $c_0$, $c_1$, $c_2$ are predefined or configured by higher layers via an advanced master information block (xMIB), an advanced system information block (xSIB), or a UE specific dedicated radio resource control (RRC) signaling, where $n_{CCE}$ and $I_{sym}$ are a lowest CCE index and OFDM symbol index for the xPDCCH transmission, respectively, $D_{xPUCCH}$ is a configured parameter that is one of cell specific or UE specific and $p_0$ is an antenna port; or determine the xPUCCH transmission for a second antenna port, for the UE with at least two antenna ports for transmitting the xPUCCH, according to equation: $n_{xPUCCH}^{(p1)} = c_0 \cdot n_{CCE} + c_1 \cdot I_{sym} + c_2 \cdot D_{xPUCCH} + \Delta$, where $\Delta$ is a constant and $p_1$ is the second antenna port.

Example 10 includes the apparatus of example 1 or 8, wherein the one or more processors and memory are further configured to: determine the xPUCCH transmission, for the UE that is configured with one antenna port for transmitting the xPUCCH, according to equation: $n_{xPUCCH}^{(p0)} = b_0 \cdot I_{PRB} + b_1 \cdot n_{DMRS} + b_2$, where $b_0$, $b_1$, $b_2$ are predefined or configured by higher layers via an advanced master information block (xMIB), an advanced system information block (xSIB), or a UE specific dedicated radio resource control (RRC) signaling, where $I_{PRB}$ and $n_{DMRS}$ are a lowest physical resource block index and Demodulation Reference Signal (DM-RS) index for a corresponding xPDSCH transmission, respectively, and $p_0$ is an antenna port; or determine the xPUCCH transmission for a second antenna port, for the UE with at least two antenna ports for transmitting the xPUCCH, according to equation: $n_{xPUCCH}^{(p1)} = b_0 \cdot I_{PRB} + b_1 \cdot n_{DMRS} + b_2 + \Delta$, where $\Delta$ is a constant and $p_1$ is the second antenna port.

Example 11 includes the apparatus of example 1 or 8, wherein the one or more processors and memory are further configured to: determine the xPUCCH transmission, for the UE that is configured with one antenna port for transmitting the xPUCCH, according to equation: $n_{xPUCCH}^{(p0)} = a_0 \cdot N_{cell}^{ID} + a_1 \cdot k_{xPUCCH} + a_2$, where $a_0$, $a_1$, $a_2$ are predefined or configured by higher layers via an advanced master information block (xMIB), an advanced system information block (xSIB), or a UE specific dedicated radio resource control (RRC) signaling, where $N_{cell}^{ID}$ is the physical cell ID or the virtual cell ID and $k_{xPUCCH}$ is a UE specific parameter that is configured by the UE specific RRC signalling, and $p_0$ is an antenna port and 0 is zero or a positive integer; or determine the xPUCCH transmission for a second antenna port, for the UE with at least two antenna ports for transmitting the xPUCCH, according to equation: $n_{xPUCCH}^{(p1)} = a_0 \cdot N_{cell}^{ID} + a_1 \cdot k_{xPUCCH} + a_2 + \Delta$, where $\Delta$ is a constant and $p_1$ is the second antenna port.

Example 12 includes the apparatus of example 1, wherein the xPUCCH resource index allocated for the xPUCCH transmission is explicitly signaled in downlink control information (DCI), wherein the DCI format is used to signal one set index from two sets of xPUCCH resource indexes.

Example 13 includes the apparatus of example 1 or 3, wherein the xPUCCH resource index defined as $n_{xPUCCH}^{(p)}$ is signaled in the DCI.

Example 14 includes the apparatus of example 1 or 3, wherein resource allocation for the xPUCCH transmission occurs after a PUSCH resource allocation type 0 or a PUSCH resource allocation type 1.

Example 15 includes the apparatus of example 1, wherein a length for transmitting the xPUCCH or a number of resource blocks of the xPUCCH is predefined; wherein a resource allocation field in a scheduling grant for transmitting the xPUCCH includes a starting resource block ($RB_{START}$).

Example 16 includes the apparatus of example 15, wherein the resource allocation field in the scheduling grant for the transmission of xPUCCH consists of a starting resource block group ($RBG_{START}$).

Example 17 includes the apparatus of example 15, wherein the length of the xPUCCH transmission is included in the scheduling grant.

Example 18 includes the apparatus of example 15, wherein the length of the xPUCCH transmission is determined from the xPDCCH transmission that is used to schedule a corresponding xPUCCH transmission; wherein the length of the xPUCCH transmission is defined as a function of aggregation level used for transmitting the xPDCCH.

Example 19 includes the apparatus of example 1 or 3, wherein a hashing function is defined as a function of a Cell Radio Network Temporary Identifier (C-RNTI) of the UE, a slot or subframe index for the UE to determine the frequency resource for transmission of the xPUCCH.

Example 20 includes the apparatus of example 1 or 3, wherein the comb index ($n_{comb}$) or orthogonal cover code index ($n_{oc}$) is explicitly indicated in downlink control information that carries a scheduling grant of the xPUCCH transmission or configured by higher layers via UE specific dedicated RRC signalling, and wherein a starting resource block of the xPUCCH transmission is equivalent to one of a lowest or a highest index physical resource block (PRB) used for transmission of an associated xPDSCH or and associated xPDCCH, wherein the apparatus includes at least one of an antenna, a touch sensitive display screen, a speaker, a microphone, a graphics processor, a baseband processor, an application processor, internal memory, a non-volatile memory port, and combinations thereof.

Example 21 includes an apparatus of a User Equipment (UE), the UE configured to communicate with an eNodeB, the apparatus comprising one or more processors and memory configured to: determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof and signal a transceiver of the UE to transmit to the eNodeB uplink control information (UCI) using the one or more physical resources designated by the xPUCCH resource index, wherein each xPUCCH transmission occupies $N_{xPUCCH}^{RB}$ physical resource blocks, wherein the $N_{xPUCCH}^{RB}$ physical resource blocks of the xPUCCH is a number of resource blocks in the xPUCCH and consist of contiguous resource blocks or non-contiguous resource blocks that are distributed across an UL transmission band or a set of resource blocks configured by higher layers.

Example 22 includes the apparatus of example 21, wherein the one or more processors and memory are further configured to: define a resource value for the xPUCCH transmission as $n_{xPUCCH}^{(p)}$ where P is an antenna port index, wherein the resource value is the xPUCCH resource index; or determine, according to the resource value, a frequency resource allocated for the xPUCCH transmission, an orthogonal cover code index ($n_{oc}$), a comb index ($n_{comb}$), or a combination thereof.

Example 23 includes the apparatus of example 21 or 22, wherein the one or more processors and memory are further configured to: multiplex the xPUCCH transmission within one xPUCCH frequency resource using code division multiplexing (CDM), wherein the frequency resource allocated for the xPUCCH transmission and the orthogonal cover code index ($n_{oc}$) is defined as:

$$\begin{cases} m = \lfloor n_{xPUCCH}^{(p)} / N_{SF}^{xPUCCH} \rfloor, & m = 0, 1, \ldots, K-1 \\ n_{oc} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource; or multiplex the xPUCCH transmission within one xPUCCH frequency resource using frequency division multiplexing (FDM), wherein the frequency resource allocated for the xPUCCH transmission and the comb index ($n_{comb}$) is defined $$\begin{cases} m = \lfloor n_{xPUCCH}^{(p)} / N_{SF}^{xPUCCH} \rfloor, & m = 0, 1, \ldots, K-1 \\ n_{comb} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource.

Example 24 includes the apparatus of example 21, wherein the xPUCCH resource index is derived from at least one of a plurality of parameters, wherein the plurality of parameters include at least one of a control channel element (CCE) index, a orthogonal frequency-division multiplexing (OFDM) symbol index for a corresponding xPDCCH transmission, a Demodulation Reference Signal (DM-RS) index, an antenna port index used for a corresponding advanced physical downlink shared channel (xPDSCH) or the corresponding xPDCCH transmission, a physical resource block (PRB) index for the corresponding xPDSCH transmission, a subframe index for the corresponding xPDSCH transmission, a physical cell identity (ID), a virtual cell ID, cell specific parameters, UE specific parameters, a control channel set index, an xPUCCH resource index of a first HARQ-ACK response at a start of semi-persistent xPDSCH scheduling, and a Cell Radio Network Temporary Identifier (C-RNTI) of the UE.

Example 25 includes the apparatus of example 21 or 24, wherein the one or more processors and memory are further configured to: determine the xPUCCH transmission, for the UE that is configured with one antenna port for transmitting the xPUCCH, according to equation: $n_{xPUCCH}^{(p0)} = c_0 \cdot n_{CCE} + c_1 \cdot I_{sym} + c_2 \cdot D_{xPUCCH}$, where $c_0$, $c_1$, $c_2$ are predefined or configured by higher layers via an advanced master information block (xMIB), an advanced system information block (xSIB), or a UE specific dedicated radio resource control (RRC) signaling, where $n_{CCE}$ and $I_{sym}$ are a lowest CCE index and OFDM symbol index for the xPDCCH transmission, respectively, $D_{xPUCCH}$ is a configured parameter that is one of cell specific or UE specific, and $p_0$ is an antenna port; determine the xPUCCH transmission for a second antenna port, for the UE with at least two antenna ports for transmitting the xPUCCH, according to equation: $n_{xPUCCH}^{(p1)} = c_0 \cdot n_{CCE} + c_1 \cdot I_{sym} + c_2 \cdot D_{xPUCCH} \Delta$, where $\Delta$ is a constant and $p_1$ is the second antenna port; determine the xPUCCH transmission, for the UE that is configured with one antenna port for transmitting the xPUCCH, according to equation: $n_{xPUCCH}^{(p0)} = b_0 \cdot I_{PRB} + b_1 \cdot n_{DMRS} + b_2$, where $b_0$, $b_1$, $b_2$ are predefined or configured by higher layers via an advanced master information block (xMIB), an advanced system information block (xSIB), or a UE specific dedicated radio resource control (RRC) signaling, where $I_{PRB}$ and $n_{DMRS}$ are a lowest physical resource block index and Demodulation Reference Signal (DM-RS) index for a corresponding xPDSCH transmission, respectively; determine the xPUCCH transmission for a second antenna port, for the UE with at least two antenna ports for transmitting the xPUCCH, according to equation: $n_{xPUCCH}^{(p1)} = b_0 \cdot I_{PRB} + b_1 \cdot n_{DMRS} + b_2 + \Delta$, where $\Delta$ is a constant and $p_1$ is the second antenna port; or determine the xPUCCH transmission, for the UE that is configured with one antenna port for transmitting the xPUCCH, according to equation: $n_{xPUCCH}^{(p0)} = a_0 \cdot N_{cell}^{ID} + a_1 \cdot k_{xPUCCH} + a_2$, where $a_0$, $a_1$, $a_2$ are predefined or configured by higher layers via an advanced master information block (xMIB), an advanced system information block (xSIB), or a UE specific dedicated radio resource control (RRC) signaling, where $N_{cell}^{ID}$ is the physical cell ID or the virtual cell ID and $k_{xPUCCH}$ is a UE specific parameter that is configured by the UE specific RRC signalling; or determine the xPUCCH transmission for a second antenna port, for the UE with at least two antenna ports for transmitting the xPUCCH, according to equation: $n_{xPUCCH}^{(p1)} = a_0 \cdot N_{cell}^{ID} + a_1 \cdot k_{xPUCCH} + a_2 + \Delta$, where $\Delta$ is a constant and $p_1$ is the second antenna port.

Example 26 includes at least one machine readable storage medium having instructions embodied thereon for an eNodeB to communicate with a User Equipment (UE), the instructions when executed cause the eNodeB to: signal a transceiver of the eNodeB to transmit to the UE, one or more parameters in downlink control information (DCI) to enable the UE to determine an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof; and process, at the eNodeB, uplink control information (UCI) transmitted by the UE using the one or more physical resources designated by the xPUCCH resource index.

Example 27 includes the at least one machine readable storage medium of example 26, further comprising instructions which when executed cause the eNodeB to: configure one or more xPUCCH resource indices by higher layer signaling via UE specific radio resource control (RRC) signaling; or indicate by a resource allocation field in downlink control information (DCI) the xPUCCH resource index out of the one or more xPUCCH resource indices for transmission of the xPUCCH.

Example 28 includes the at least one machine readable storage medium of example 27, wherein a subframe index for the xPUCCH transmission is determined from a subframe index of a corresponding DCI transmission; wherein an additional field is used in combination with the resource allocation field to indicate the one or more xPUCCH resource indices in one of a Time-Division Duplex (TDD) domain, frequency division duplex (FDD) domain, code domain, or combination thereof.

Example 29 includes the at least one machine readable storage medium of example 26, further comprising instructions which when executed cause the eNodeB to: explicitly signal the xPUCCH resource index allocated for the xPUCCH transmission in the DCI, wherein one or more DCI formats are used to signal one set index from one or more sets of xPUCCH resource indexes.

Example 30 includes the at least one machine readable storage medium of example 26 or 27, further comprising instructions which when executed cause the eNodeB to: explicitly indicate, a comb index ($n_{comb}$) or orthogonal cover code index ($n_{oc}$), in the DCI that carries a scheduling grant of the xPUCCH transmission or configured by higher layers via UE specific dedicated RRC signalling, and wherein a starting resource block of the xPUCCH transmission is equivalent to one of a lowest or a highest index physical resource block (PRB) used for transmission of an associated xPDSCH or and associated xPDCCH.

Example 31 includes an apparatus of a User Equipment (UE), the UE configured to communicate with an eNodeB, the apparatus comprising one or more processors and memory configured to: determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof; and signal a transceiver of the UE to transmit to the eNodeB uplink control information (UCI) using the one or more physical resources designated by the xPUCCH resource index.

Example 32 includes the apparatus of example 31, wherein each xPUCCH transmission occupies $N_{xPUCCH}^{RB}$ physical resource blocks, wherein the $N_{xPUCCH}^{RB}$ physical resource blocks of the xPUCCH is a number of resource blocks in the xPUCCH and consist of contiguous resource blocks or non-contiguous resource blocks that are distributed across an UL transmission band or a set of resource blocks configured by higher layers.

Example 33 includes the apparatus of example 31, wherein the one or more processors and memory are further configured to: define a resource value for the xPUCCH transmission as $n_{xPUCCH}^{(p)}$ where P is an antenna port index, wherein the resource value is the xPUCCH resource index; or determine, according to the resource value, a frequency resource allocated for the xPUCCH transmission, an orthogonal cover code index ($n_{oc}$), a comb index ($n_{comb}$), or a combination thereof.

Example 34 includes the apparatus of example 33, wherein the one or more processors and memory are further configured to: multiplex the xPUCCH transmission within one xPUCCH frequency resource using code division multiplexing (CDM), wherein the frequency resource allocated for the xPUCCH transmission and the orthogonal cover code index ($n_{oc}$) is defined as:

$$\begin{cases} m = \lfloor n^{(p)}_{xPUCCH}/N^{xPUCCH}_{SF} \rfloor, & m = 0, 1, \ldots, K-1 \\ n_{oc} = n^{(p)}_{xPUCCH} \bmod N^{xPUCCH}_{SF} \end{cases},$$

where (m) is the frequency resource, mod is a modulo operation, and $n_{SF}^{xPUCCH}$ is a spreading factor within each xPUCCH frequency resource; or multiplex the xPUCCH transmission within one xPUCCH frequency resource using frequency division multiplexing (FDM), wherein the frequency resource allocated for the xPUCCH transmission and the comb index ($n_{comb}$) is defined as:

$$\begin{cases} m = \lfloor n^{(p)}_{xPUCCH}/N^{xPUCCH}_{SF} \rfloor, & m = 0, 1, \ldots, K-1 \\ n_{comb} = n^{(p)}_{xPUCCH} \bmod N^{xPUCCH}_{SF} \end{cases},$$

where (m) is the frequency resource, mod is a modulo operation, and $N_{SF}^{xPUCCH}$ is a spreading factor within each xPUCCH frequency resource.

Example 35 includes the apparatus of example 33, wherein the resource value of $n_{xPUCCH}^{(p)}$ for transmitting the xPUCCH is semi-statically configure by one or more higher layers.

Example 36 includes the apparatus of example 31, wherein the one or more processors and memory are further configured to: configure one or more xPUCCH resource indices by higher layer signaling via UE specific radio resource control (RRC) signaling; wherein a resource allocation field in downlink control information (DCI) is used to indicate the xPUCCH resource index out of the one or more xPUCCH resource indices for transmission of the xPUCCH.

Example 37 includes the apparatus of example claim 27, wherein a subframe index for the xPUCCH transmission is determined from a subframe index of a corresponding DCI transmission; wherein an additional field is used in combination with the resource allocation field to indicate the one or more xPUCCH resource indices in one of a Time-Division Duplex (TDD) domain, frequency division duplex (FDD) domain, code domain, or combination thereof.

Example 38 includes the apparatus of example 31, wherein the xPUCCH resource index is derived from at least one of a plurality of parameters, wherein the plurality of parameters include at least one of a control channel element (CCE) index, a orthogonal frequency-division multiplexing (OFDM) symbol index for a corresponding xPDCCH transmission, a Demodulation Reference Signal (DM-RS) index, an antenna port index used for a corresponding advanced physical downlink shared channel (xPDSCH) or the corresponding xPDCCH transmission, a physical resource block (PRB) index for the corresponding xPDSCH transmission, a subframe index for the corresponding xPDSCH transmission, a physical cell identity (ID), a virtual cell ID, cell specific parameters, UE specific parameters, a control channel set index, an xPUCCH resource index of a first HARQ-ACK response at a start of semi-persistent xPDSCH scheduling, and a Cell Radio Network Temporary Identifier (C-RNTI) of the UE.

Example 39 includes the apparatus of example 38, wherein the one or more processors and memory are further configured to: determine the xPUCCH transmission, for the UE that is configured with one antenna port for transmitting the xPUCCH, according to equation: $n_{xPUCCH}^{(p0)} = c_0 \cdot n_{CCE} + c_1 \cdot I_{sym} + c_2 \cdot D_{xPUCCH}$, where $c_0$, $c_1$, $c_2$ are predefined or configured by higher layers via an advanced master information block (xMIB), an advanced system information block (xSIB), or a UE specific dedicated radio resource control (RRC) signaling, where $n_{CCE}$ and $I_{sym}$ are a lowest CCE index and OFDM symbol index for the xPDCCH transmission, respectively, $D_{xPUCCH}$ is a configured parameter that is one of cell specific or UE specific and $p_0$ is an antenna port; or determine the xPUCCH transmission for a second antenna port, for the UE with at least two antenna ports for transmitting the xPUCCH, according to equation: $n_{xPUCCH}^{(p1)} = c_0 \cdot n_{CCE} + c_1 \cdot I_{sym} + c_2 \cdot D_{xPUCCH} + \Delta$, where $\Delta$ is a constant and $p_1$ is the second antenna port. 'Example 40 includes the apparatus of example 38, wherein the one or more processors and memory are further configured to determine the xPUCCH transmission, for the UE that is configured with one antenna port for transmitting the xPUCCH, according to equation: $n_{xPUCCH}^{(p0)} = b_0 \cdot I_{PRB} + b_1 \cdot n_{DMRS} + b_2$, where $b_0$, $b_1$, $b_2$ are predefined or configured by higher layers via an advanced master information block (xMIB), an advanced system information block (xSIB), or a UE specific dedicated radio resource control (RRC) signaling, where $I_{PRB}$ and $n_{DMRS}$ are a lowest physical resource block index and Demodulation Reference Signal (DM-RS) index for a corresponding xPDSCH transmission, respectively, and $p_0$ is an antenna port; or determine the xPUCCH transmission for a second antenna port, for the UE with at least two antenna ports for transmitting the xPUCCH, according to equation; $n_{xPUCCH}^{(p1)} = b_0 \cdot I_{PRB} + b_1 \cdot n_{DMRS} + b_2 + \Delta$, where $\Delta$ is a constant and $p_1$ is the second antenna port.

Example 41 includes the apparatus of example 38, wherein the one or more processors and memory are further configured to: determine the xPUCCH transmission, for the UE that is configured with one antenna port for transmitting the xPUCCH, according to equation: $n_{xPUCCH}^{(p0)} = a_0 \cdot N_{cell}^{ID} + a_1 \cdot k_{xPUCCH} + a_2$, where $a_0$, $a_1$, $a_2$ are predefined or configured by higher layers via an advanced master information block (xMIB), an advanced system information block (xSIB), or a UE specific dedicated radio resource control (RRC) signaling, where $N_{cell}^{ID}$ is the physical cell ID or the virtual cell ID and $k_{xPUCCH}$ is a UE specific parameter that is configured by the UE specific RRC signalling, and $p_0$ is an antenna port and 0 is zero or a positive integer; or determine the xPUCCH transmission for a second antenna port, for the UE with at least two antenna ports for transmitting the xPUCCH, according to equation: $n_{xPUCCH}^{(p1)} = a_0 \cdot N_{cell}^{ID} + a_1 \cdot k_{xPUCCH} + a_2 + \Delta$, where $\Delta$ is a constant and $p_1$ is the second antenna port.

Example 42 includes the apparatus of example 31, wherein the xPUCCH resource index allocated for the xPUCCH transmission is explicitly signaled in downlink control information (DCI), wherein the DCI format is used to signal one set index from two sets of xPUCCH resource indexes.

Example 43 includes the apparatus of example 33, wherein the xPUCCH resource index defined as $n_{xPUCCH}^{(p)}$ is signaled in the DCI.

Example 44 includes the apparatus of example 33, wherein resource allocation for the xPUCCH transmission occurs after a PUSCH resource allocation type 0 or a PUSCH resource allocation type 1.

Example 45 includes the apparatus of example 31, wherein a length for transmitting the xPUCCH or a number of resource blocks of the xPUCCH is predefined; wherein a resource allocation field in a scheduling grant for transmitting the xPUCCH includes a starting resource block ($RB_{START}$).

Example 46 includes the apparatus of example 35, wherein the resource allocation field in the scheduling grant for the transmission of xPUCCH consists of a starting resource block group ($RBG_{START}$).

Example 47 includes the apparatus of example 35, wherein the length of the xPUCCH transmission is included in the scheduling grant.

Example 48 includes the apparatus of example 35, wherein the length of the xPUCCH transmission is determined from the xPDCCH transmission that is used to schedule a corresponding xPUCCH transmission; wherein the length of the xPUCCH transmission is defined as a function of aggregation level used for transmitting the xPDCCH.

Example 49 includes the apparatus of example 33, wherein a hashing function is defined as a function of a Cell Radio Network Temporary Identifier (C-RNTI) of the UE, a slot or subframe index for the UE to determine the frequency resource for transmission of the xPUCCH.

Example 50 includes the apparatus of example 33, wherein the comb index ($n_{comb}$) or orthogonal cover code index ($n_{oc}$) is explicitly indicated in downlink control information that carries a scheduling grant of the xPUCCH transmission or configured by higher layers via UE specific dedicated RRC signalling, and wherein a starting resource block of the xPUCCH transmission is equivalent to one of a lowest or a highest index physical resource block (PRB) used for transmission of an associated xPDSCH or and associated xPDCCH, wherein the apparatus includes at least one of an antenna, a touch sensitive display screen, a speaker, a microphone, a graphics processor, a baseband processor, an application processor, internal memory, a non-volatile memory port, and combinations thereof.

Example 51 includes an apparatus of a User Equipment (UE), the UE configured to communicate with an eNodeB, the apparatus comprising one or more processors and memory configured to: determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof signal a transceiver of the UE to transmit to the eNodeB uplink control information (UCI) using the one or more physical resources designated by the xPUCCH resource index, wherein each xPUCCH transmission occupies $N_{xPUCCH}^{RB}$ physical resource blocks, wherein the $N_{xPUCCH}^{RB}$ physical resource blocks of the xPUCCH is a number of resource blocks in the xPUCCH and consist of contiguous resource blocks or non-contiguous resource blocks that are distributed across an UL transmission band or a set of resource blocks configured by higher layers.

Example 52 includes the apparatus of example 51, wherein the one or more processors and memory are further configured to: define a resource value for the xPUCCH transmission as $N_{xPUCCH}^{(p)}$, where P is an antenna port index, wherein the resource value is the xPUCCH resource index; or determine, according to the resource value, a frequency resource allocated for the xPUCCH transmission, an orthogonal cover code index ($n_{oc}$), a comb index ($n_{comb}$), or a combination thereof.

Example 53 includes the apparatus of example 52, wherein the one or more processors and memory are further configured to: multiplex the xPUCCH transmission within one xPUCCH frequency resource using code division multiplexing (CDM), wherein the frequency resource allocated for the xPUCCH transmission and the orthogonal cover code index ($n_{oc}$) is defined as:

$$\begin{cases} m = \lfloor n_{xPUCCH}^{(p)} / N_{SF}^{xPUCCH} \rfloor, \ m = 0, 1, \ldots , K-1 \\ n_{oc} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource; or multiplex the xPUCCH transmission within one xPUCCH frequency resource using frequency division multiplexing (FDM), wherein the frequency resource allocated for the xPUCCH transmission and the comb index ($n_{comb}$) is defined as:

$$\begin{cases} m = \lfloor n_{xPUCCH}^{(p)} / N_{SF}^{xPUCCH} \rfloor, \ m = 0, 1, \ldots , K-1 \\ n_{comb} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource.

Example 54 includes the apparatus of example 51, wherein the xPUCCH resource index is derived from at least one of a plurality of parameters, wherein the plurality of parameters include at least one of a control channel element (CCE) index, a orthogonal frequency-division multiplexing (OFDM) symbol index for a corresponding xPDCCH transmission, a Demodulation Reference Signal (DM-RS) index, an antenna port index used for a corresponding advanced physical downlink shared channel (xPDSCH) or the corresponding xPDCCH transmission, a physical resource block (PRB) index for the corresponding xPDSCH transmission, a subframe index for the corresponding xPDSCH transmission, a physical cell identity (ID), a virtual cell ID, cell specific parameters, UE specific parameters, a control channel set index, an xPUCCH resource index of a first HARQ-ACK response at a start of semi-persistent xPDSCH scheduling, and a Cell Radio Network Temporary Identifier (C-RNTI) of the UE.

Example 55 includes the apparatus of example 54, wherein the one or more processors and memory are further configured to: determine the xPUCCH transmission, for the UE that is configured with one antenna port for transmitting the xPUCCH, according to equation: $n_{xPUCCH}^{(p0)} = c_0 \cdot n_{CCE} + c_1 \cdot I_{sym} + c_2 \cdot D_{xPUCCH}$, where $c_0$, $c_1$, $c_2$ are predefined or configured by higher layers via an advanced master information block (xMIB), an advanced system information block (xSIB), or a UE specific dedicated radio resource control (RRC) signaling, where $n_{CCE}$ and $I_{sym}$ are a lowest CCE index and OFDM symbol index for the xPDCCH transmission, respectively, $D_{xPUCCH}$ is a configured parameter that is one of cell specific or UE specific, and $p_0$ is an antenna port; determine the xPUCCH transmission for a second antenna port, for the UE with at least two antenna ports for transmitting the xPUCCH, according to equation: $n_{xPUCCH}^{(p1)} = c_0 \cdot n_{CCE} + c_1 \cdot I_{sym} + c_2 \cdot D_{xPUCCH} + \Delta$, where $\Delta$ is a constant and $p_1$ is the second antenna port; determine the xPUCCH transmission, for the UE that is configured with one antenna port for transmitting the xPUCCH, according to equation: $n_{xPUCCH}^{(p1)} = b_0 \cdot I_{PRB} + b_1 \cdot n_{DMRS} + b_2$, where $b_0$, $b_1$, $b_2$ are predefined or configured by higher layers via an advanced master information block (xMIB), an advanced system information block (xSIB), or a UE specific dedicated radio resource control (RRC) signaling, where $I_{PRB}$ and $n_{DMRS}$ are a lowest physical resource block index and Demodulation Reference Signal (DM-RS) index for a corresponding xPDSCH transmission, respectively; determine the xPUCCH transmission for a second antenna port, for the UE with at least two antenna ports for transmitting the xPUCCH, according to equation: $n_{xPUCCH}^{(p1)} = b_0 \cdot I_{PRB} + b_1 \cdot n_{DMRS} + b_2 + \Delta$, where $\Delta$ is a constant and $p_1$ is the second antenna port; determine the xPUCCH transmission, for the UE that is configured with one antenna port for transmitting the xPUCCH, according to equation: $n_{xPUCCH}^{(p0)} = a_0 \cdot N_{cell}^{ID} + a_1 \cdot k_{xPUCCH} + a_2$, where $a_0$, $a_1$, $a_2$ are predefined or configured by higher layers via an advanced master information block (xMIB), an advanced system information block (xSIB), or a UE specific dedicated radio resource control (RRC) signaling, where $N_{cell}^{ID}$ is the physical cell ID or the virtual cell ID and $k_{xPUCCH}$ is a UE specific parameter that is configured by the UE specific RRC signalling; or determine the xPUCCH transmission for a second antenna port, for the UE with at least two antenna ports for transmitting the xPUCCH, according to equation: $n_{xPUCCH}^{(p1)} = a_0 \cdot N_{cell}^{ID} + a_1 \cdot k_{xPUCCH} + a_2 + \Delta$, where $\Delta$ is a constant and $p_1$ is the second antenna port.

Example 56 includes at least one non-transitory machine readable storage medium having instructions embodied thereon for an eNodeB to communicate with a User Equipment (UE), the instructions when executed cause the eNodeB to: signal a transceiver of the eNodeB to transmit to the UE, one or more parameters in downlink control information (DCI) to enable the UE to determine an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof and process, at the eNodeB, uplink control information (UCI) transmitted by the UE using the one or more physical resources designated by the xPUCCH resource index.

Example 57 include the at least one non-transitory machine readable storage medium of example 56, further comprising instructions which when executed cause the eNodeB to: configure one or more xPUCCH resource indices by higher layer signaling via UE specific radio resource control (RRC) signaling; or indicate by a resource allocation field in downlink control information (DCI) the xPUCCH resource index out of the one or more xPUCCH resource indices for transmission of the xPUCCH.

Example 58 includes at least one non-transitory machine readable storage medium of example 57, wherein a subframe index for the xPUCCH transmission is determined from a subframe index of a corresponding DCI transmission; wherein an additional field is used in combination with the resource allocation field to indicate the one or more xPUCCH resource indices in one of a Time-Division Duplex (TDD) domain, frequency division duplex (FDD) domain, code domain, or combination thereof.

Example 59 at least one non-transitory machine readable storage medium of example 56, further comprising instructions which when executed cause the eNodeB to: explicitly signal the xPUCCH resource index allocated for the xPUCCH transmission in the DCI, wherein one or more DCI formats are used to signal one set index from one or more sets of xPUCCH resource indexes.

Example 60 includes the at least one non-transitory machine readable storage medium of example 56 or 57, further comprising instructions which when executed cause the eNodeB to: explicitly indicate, a comb index ($n_{comb}$) or orthogonal cover code index ($n_{oc}$), in the DCI that carries a scheduling grant of the xPUCCH transmission or configured by higher layers via UE specific dedicated RRC signalling, and wherein a starting resource block of the xPUCCH transmission is equivalent to one of a lowest or a highest index physical resource block (PRB) used for transmission of an associated xPDSCH or and associated xPDCCH.

Example 61 includes an apparatus of a User Equipment (UE), the UE configured to communicate with an eNodeB, the apparatus comprising one or more processors and memory configured to: determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof; and signal a transceiver of the UE to transmit to the eNodeB uplink control information (UCI) using the one or more physical resources designated by the xPUCCH resource index.

Example 62 includes the apparatus of example 61, wherein each xPUCCH transmission occupies $N_{xPUCCH}^{RB}$ physical resource blocks, wherein the $N_{xPUCCH}^{RB}$ physical resource blocks of the xPUCCH is a number of resource blocks in the xPUCCH and consist of contiguous resource blocks or non-contiguous resource blocks that are distributed across an UL transmission band or a set of resource blocks configured by higher layers.

Example 63 includes the apparatus of example 61 or 62, wherein the one or more processors and memory are further configured to: define a resource value for the xPUCCH transmission as $N_{xPUCCH}^{(p)}$, where P is an antenna port index, wherein the resource value is the xPUCCH resource index; determine, according to the resource value, a frequency resource allocated for the xPUCCH transmission, an orthogonal cover code index ($n_{oc}$), a comb index ($n_{comb}$), or a combination thereof; multiplex the xPUCCH transmission within one xPUCCH frequency resource using code division multiplexing (CDM), wherein the frequency resource allocated for the xPUCCH transmission and the orthogonal cover code index ($n_{oc}$) is defined as:

$$\begin{cases} m = \lfloor n_{xPUCCH}^{(p)} / N_{SF}^{xPUCCH} \rfloor, \quad m = 0, 1, \ldots, K-1 \\ n_{oc} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource; multiplex the xPUCCH transmission within one xPUCCH frequency resource using frequency division multiplexing (FDM), wherein the frequency resource allocated for the xPUCCH transmission and the comb index ($n_{comb}$) is defined as:

$$\begin{cases} m = \lfloor n_{xPUCCH}^{(p)} / N_{SF}^{xPUCCH} \rfloor, \quad m = 0, 1, \ldots, K-1 \\ n_{comb} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource, wherein the resource value of $n_{xPUCCH}^{(p)}$ for transmitting the xPUCCH is semi-statically configure by one or more higher layers; or configure one or more xPUCCH resource indices by higher layer signaling via UE specific radio resource control (RRC) signaling; wherein a resource allocation field in downlink control information (DCI) is used to indicate the xPUCCH resource index out of the one or more xPUCCH resource indices for transmission of the xPUCCH, wherein a subframe index for the xPUCCH transmission is determined from a subframe index of a corresponding DCI transmission; wherein an additional field is used in combination with the resource allocation field to indicate the one or more xPUCCH resource indices in one of a Time-Division Duplex (TDD) domain, frequency division duplex (FDD) domain, code domain, or combination thereof.

In example 64, the subject matter of Example 61 or any of the Examples described herein may further include, wherein the xPUCCH resource index is derived from at least one of a plurality of parameters, wherein the plurality of parameters include at least one of a control channel element (CCE) index, a orthogonal frequency-division multiplexing (OFDM) symbol index for a corresponding xPDCCH transmission, a Demodulation Reference Signal (DM-RS) index, an antenna port index used for a corresponding advanced physical downlink shared channel (xPDSCH) or the corresponding xPDCCH transmission, a physical resource block (PRB) index for the corresponding xPDSCH transmission, a subframe index for the corresponding xPDSCH transmission, a physical cell identity (ID), a virtual cell ID, cell specific parameters, UE specific parameters, a control channel set index, an xPUCCH resource index of a first HARQ-ACK response at a start of semi-persistent xPDSCH scheduling, and a Cell Radio Network Temporary Identifier (C-RNTI) of the UE.

In example 65, the subject matter of Example 61 or any of the Examples described herein may further include, wherein the one or more processors and memory are further configured to: determine the xPUCCH transmission, for the UE that is configured with one antenna port for transmitting the xPUCCH, according to equation: $n_{xPUCCH}^{(p0)} = c_0 \cdot n_{CCE} + c_1 \cdot I_{sym} + c_2 \cdot D_{xPUCCH}$, where $c_0$, $c_1$, $c_2$ are predefined or configured by higher layers via an advanced master information block (xMIB), an advanced system information block (xSIB), or a UE specific dedicated radio resource control (RRC) signaling, where $n_{CCE}$ and $I_{sym}$ are a lowest CCE index and OFDM symbol index for the xPDCCH transmission, respectively, $D_{xPUCCH}$ is a configured parameter that is one of cell specific or UE specific and $p_0$ is an antenna port; determine the xPUCCH transmission for a second antenna port, for the UE with at least two antenna ports for transmitting the xPUCCH, according to equation: $n_{xPUCCH}^{(p1)} = c_0 \cdot n_{CCE} + c_1 \cdot I_{sym} + c_2 \cdot D_{xPUCCH} + \Delta$, where $\Delta$ is a constant and $p_1$ is the second antenna port; determine the xPUCCH transmission, for the UE that is configured with one antenna port for transmitting the xPUCCH, according to equation: $n_{xPUCCH}^{(p0)} = b_0 \cdot I_{PRB} + b_1 \cdot n_{DMRS} + b_2$, where $b_0$, $b_1$, $b_2$ are predefined or configured by higher layers via an advanced master information block (xMIB), an advanced system information block (xSIB), or a UE specific dedicated radio resource control (RRC) signaling, where $I_{PRB}$ and $n_{DMRS}$ are a lowest physical resource block index and Demodulation Reference Signal (DM-RS) index for a corresponding xPDSCH transmission, respectively, and $p_0$ is an antenna port; determine the xPUCCH transmission for a second antenna port, for the UE with at least two antenna ports for transmitting the xPUCCH, according to equation: $n_{xPUCCH}^{(p1)} = b_0 \cdot I_{PRB} + b_1 \cdot n_{DMRS} + b_2 + \Delta$, where $\Delta$ is a constant and $p_1$ is the second antenna port; determine the xPUCCH transmission, for the UE that is configured with one antenna port for transmitting the xPUCCH, according to equation: $n_{xPUCCH}^{(p0)} = a_0 \cdot N_{cell}^{ID} + a_1 \cdot k_{xPUCCH} + a_2$, where $a_0$, $a_1$, $a_2$ are predefined or configured by higher layers via an advanced master information block (xMIB), an advanced system information block (xSIB), or a UE specific dedicated radio resource control (RRC) signaling, where $N_{cell}^{ID}$ is the physical cell ID or the virtual cell ID and $k_{xPUCCH}$ is a UE specific parameter that is configured by the UE specific RRC signalling, and $p_0$ is an antenna port and 0 is zero or a positive integer; determine the xPUCCH transmission for a second antenna port, for the UE with at least two antenna ports for transmitting the xPUCCH, according to equation: $n_{xPUCCH}^{(p1)} = a_0 \cdot N_{cell}^{ID} + a_1 \cdot k_{xPUCCH} + a_2 + \Delta$, where $\Delta$ is a constant and $p_1$ is the second antenna port, wherein the xPUCCH resource index allocated for the xPUCCH transmission is explicitly signaled in downlink control information (DCI), wherein the DCI format is used to signal one set index from two sets of xPUCCH resource indexes, or wherein the xPUCCH resource index defined as $n_{xPUCCH}^{(p)}$ is signaled in the DCI, wherein resource allocation for the xPUCCH transmission occurs after a PUSCH resource allocation type 0 or a PUSCH resource allocation type 1, wherein a length for transmitting the xPUCCH or a number of resource blocks of the xPUCCH is predefined; wherein a resource allocation field in a scheduling grant for transmitting the xPUCCH includes a starting resource block ($RB_{START}$) wherein the resource allocation field in the scheduling grant for the transmission of xPUCCH consists of a starting resource block group ($RBG_{START}$), wherein the length of the xPUCCH transmission is included in the scheduling grant, wherein the length of the xPUCCH transmission is determined from the xPDCCH transmission that is used to schedule a corresponding xPUCCH transmission; wherein the length of the xPUCCH transmission is defined as a function of aggregation level used for transmitting the xPDCCH, or wherein a hashing function is defined as a function of a Cell Radio Network Temporary Identifier (C-RNTI) of the UE, a slot or subframe index for the UE to determine the frequency resource for transmission of the xPUCCH.

In example 66, the subject matter of Example 61 or any of the Examples described herein may further include, wherein the comb index ($n_{comb}$) or orthogonal cover code index ($n_{oc}$) is explicitly indicated in downlink control information that carries a scheduling grant of the xPUCCH transmission or configured by higher layers via UE specific dedicated RRC signalling, and wherein a starting resource block of the xPUCCH transmission is equivalent to one of a lowest or a highest index physical resource block (PRB) used for transmission of an associated xPDSCH or and associated xPDCCH, wherein the apparatus includes at least one of an antenna, a touch sensitive display screen, a speaker, a microphone, a graphics processor, a baseband processor, an application processor, internal memory, a non-volatile memory port, and combinations thereof.

Example 67 includes an apparatus of a User Equipment (UE), the UE configured to communicate with an eNodeB, the apparatus comprising one or more processors and memory configured to: determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof and signal a transceiver of the UE to transmit to the eNodeB uplink control information (UCI) using the one or more physical resources designated by the xPUCCH resource index, wherein each xPUCCH transmission occupies $N_{xPUCCH}^{RB}$ physical resource blocks, wherein the $N_{xPUCCH}^{RB}$ physical resource blocks of the xPUCCH is a number of resource blocks in the xPUCCH and consist of contiguous resource blocks or non-contiguous resource blocks that are distributed across an UL transmission band or a set of resource blocks configured by higher layers.

Example 68 includes the apparatus of example 67, wherein the one or more processors and memory are further configured to: define a resource value for the xPUCCH transmission as $N_{xPUCCH}^{(p)}$, where P is an antenna port index, wherein the resource value is the xPUCCH resource index; or determine, according to the resource value, a frequency resource allocated for the xPUCCH transmission, an orthogonal cover code index ($n_{oc}$), a comb index ($n_{comb}$), or a combination thereof; multiplex the xPUCCH transmission within one xPUCCH frequency resource using code division multiplexing (CDM), wherein the frequency resource allocated for the xPUCCH transmission and the orthogonal cover code index ($n_{oc}$) is defined as:

$$\begin{cases} m = \lfloor n_{xPUCCH}^{(p)}/N_{SF}^{xPUCCH} \rfloor, & m = 0, 1, \ldots, K-1 \\ n_{oc} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource; multiplex the xPUCCH transmission within one xPUCCH frequency resource using frequency division multiplexing (FDM), wherein the frequency resource allocated for the xPUCCH transmission and the comb index ($n_{comb}$) is defined as:

$$\begin{cases} m = \lfloor n_{xPUCCH}^{(p)}/N_{SF}^{xPUCCH} \rfloor, & m = 0, 1, \ldots, K-1 \\ n_{comb} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource.

Example 69 includes the apparatus of example 67 or 68, wherein the xPUCCH resource index is derived from at least one of a plurality of parameters, wherein the plurality of parameters include at least one of a control channel element (CCE) index, a orthogonal frequency-division multiplexing (OFDM) symbol index for a corresponding xPDCCH transmission, a Demodulation Reference Signal (DM-RS) index, an antenna port index used for a corresponding advanced physical downlink shared channel (xPDSCH) or the corresponding xPDCCH transmission, a physical resource block (PRB) index for the corresponding xPDSCH transmission, a subframe index for the corresponding xPDSCH transmission, a physical cell identity (ID), a virtual cell ID, cell specific parameters, UE specific parameters, a control channel set index, an xPUCCH resource index of a first HARQ-ACK response at a start of semi-persistent xPDSCH scheduling, and a Cell Radio Network Temporary Identifier (C-RNTI) of the UE.

In example 70, the subject matter of Example 67 or any of the Examples described herein may further include, wherein the one or more processors and memory are further configured to: determine the xPUCCH transmission, for the UE that is configured with one antenna port for transmitting the xPUCCH, according to equation: $n_{xPUCCH}^{(p0)} = c_0 \cdot n_{CCE} + c_1 \cdot I_{sym} + c_2 \cdot D_{xPUCCH}$, where $c_0$, $c_1$, $c_2$ are predefined or configured by higher layers via an advanced master information block (xMIB), an advanced system information block (xSIB), or a UE specific dedicated radio resource control (RRC) signaling, where $n_{CCE}$ and $I_{sym}$ are a lowest CCE index and OFDM symbol index for the xPDCCH transmission, respectively, $D_{xPUCCH}$ is a configured parameter that is one of cell specific or UE specific, and $p_0$ is an antenna port; determine the xPUCCH transmission for a second antenna port, for the UE with at least two antenna ports for transmitting the xPUCCH, according to equation: $n_{xPUCCH}^{(p1)} = c_0 \cdot n_{CCE} + c_1 \cdot I_{sym} + c_2 \cdot D_{xPUCCH} + \Delta$, where $\Delta$ is a constant and $p_1$ is the second antenna port; determine the xPUCCH transmission, for the UE that is configured with one antenna port for transmitting the xPUCCH, according to equation: $n_{xPUCCH}^{(p0)} = b_0 \cdot I_{PRB} + b_1 \cdot n_{DMRS} + b_2$, where $b_0$, $b_1$, $b_2$ are predefined or configured by higher layers via an advanced master information block (xMIB), an advanced system information block (xSIB), or a UE specific dedicated radio resource control (RRC) signaling, where $I_{PRB}$ and $n_{DMRS}$ are a lowest physical resource block index and Demodulation Reference Signal (DM-RS) index for a corresponding xPDSCH transmission, respectively; determine the xPUCCH transmission for a second antenna port, for the UE with at least two antenna ports for transmitting the xPUCCH, according to equation: $n_{xPUCCH}^{(p1)} = b_0 \cdot I_{PRB} + b_1 \cdot n_{DMRS} + b_2 + \Delta$, where $\Delta$ is a constant and $p_1$ is the second antenna port; determine the xPUCCH transmission, for the UE that is configured with one antenna port for transmitting the xPUCCH, according to equation: $n_{xPUCCH}^{(p1)} = a_0 \cdot N_{cell}^{ID} + a_1 \cdot k_{xPUCCH} + a_2$, where $a_0$, $a_1$, $a_2$ are predefined or configured by higher layers via an advanced master information block (xMIB), an advanced system information block (xSIB), or a UE specific dedicated radio resource control (RRC) signaling, where $N_{cell}^{ID}$ is the physical cell ID or the virtual cell ID and $k_{xPUCCH}$ is a UE specific parameter that is configured by the UE specific RRC signalling; or determine the xPUCCH transmission for a second antenna port, for the UE with at least two antenna ports for transmitting the xPUCCH, according to equation: $n_{xPUCCH}^{(p1)} = a_0 \cdot N_{cell}^{ID} + a_1 \cdot k_{xPUCCH} + a_2 + \Delta$, where $\Delta$ is a constant and $p_1$ is the second antenna port.

Example 71 includes least one machine readable storage medium having instructions embodied thereon for an eNodeB to communicate with a User Equipment (UE), the instructions when executed cause the eNodeB to: signal a transceiver of the eNodeB to transmit to the UE, one or more parameters in downlink control information (DCI) to enable the UE to determine an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof and process, at the eNodeB, uplink control information (UCI) transmitted by the UE using the one or more physical resources designated by the xPUCCH resource index.

Example 72 includes the at least one machine readable storage medium of example 71, further comprising instructions which when executed cause the eNodeB to: configure one or more xPUCCH resource indices by higher layer signaling via UE specific radio resource control (RRC)

signaling; or indicate by a resource allocation field in downlink control information (DCI) the xPUCCH resource index out of the one or more xPUCCH resource indices for transmission of the xPUCCH.

Example 73 includes the at least one machine readable storage medium of example 71 or 72, wherein a subframe index for the xPUCCH transmission is determined from a subframe index of a corresponding DCI transmission; wherein an additional field is used in combination with the resource allocation field to indicate the one or more xPUCCH resource indices in one of a Time-Division Duplex (TDD) domain, frequency division duplex (FDD) domain, code domain, or combination thereof.

In example 74, the subject matter of Example 71 or any of the Examples described herein may further include instructions which when executed cause the eNodeB to: explicitly signal the xPUCCH resource index allocated for the xPUCCH transmission in the DCI, wherein one or more DCI formats are used to signal one set index from one or more sets of xPUCCH resource indexes.

In example 75, the subject matter of Example 71 or any of the Examples described herein may further include instructions which when executed cause the eNodeB to: explicitly indicate, a comb index ($n_{comb}$) or orthogonal cover code index ($n_{oc}$), in the DCI that carries a scheduling grant of the xPUCCH transmission or configured by higher layers via UE specific dedicated RRC signalling, and wherein a starting resource block of the xPUCCH transmission is equivalent to one of a lowest or a highest index physical resource block (PRB) used for transmission of an associated xPDSCH or and associated xPDCCH.

Example 76 includes a device of an eNodeB, the device comprising: means for signalling a transceiver of a eNodeB to transmit to the UE, one or more parameters in downlink control information (DCI) to enable the UE to determine an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof; and means for processing, at the eNodeB, uplink control information (UCI) transmitted by the UE using the one or more physical resources designated by the xPUCCH resource index.

Example 77 includes the device of example 76, further comprising means for: configuring one or more xPUCCH resource indices by higher layer signaling via UE specific radio resource control (RRC) signaling; or indicating by a resource allocation field in downlink control information (DCI) the xPUCCH resource index out of the one or more xPUCCH resource indices for transmission of the xPUCCH.

Example 78 includes the device of example 76, wherein a subframe index for the xPUCCH transmission is determined from a subframe index of a corresponding DCI transmission; wherein an additional field is used in combination with the resource allocation field to indicate the one or more xPUCCH resource indices in one of a Time-Division Duplex (TDD) domain, frequency division duplex (FDD) domain, code domain, or combination thereof.

Example 79 includes the device of example 76, further comprising means for: explicitly signalling the xPUCCH resource index allocated for the xPUCCH transmission in the DCI, wherein one or more DCI formats are used to signal one set index from one or more sets of xPUCCH resource indexes.

Example 80 includes the device of example 76, further comprising means for: explicitly indicating, a comb index ($n_{comb}$) or orthogonal cover code index ($n_{oc}$), in the DCI that carries a scheduling grant of the xPUCCH transmission or configured by higher layers via UE specific dedicated RRC signalling, and wherein a starting resource block of the xPUCCH transmission is equivalent to one of a lowest or a highest index physical resource block (PRB) used for transmission of an associated xPDSCH or and associated xPDCCH.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a User Equipment (UE), the UE configured to communicate with a base station, the apparatus comprising:
one or more processors and memory configured to:
determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof;
configure one or more xPUCCH resource indices by higher layer signaling via UE specific radio resource control (RRC) signaling, wherein a resource allocation field in downlink control information (DCI) is used to indicate the xPUCCH resource index out of the one or more xPUCCH resource indices for transmission of the xPUCCH; and
signal a transceiver of the UE to transmit to the base station uplink control information (UCI) using the one or more physical resources designated by the xPUCCH resource index.

2. The apparatus of claim 1, wherein each xPUCCH transmission occupies $N_{xPUCCH}^{RB}$ physical resource blocks, wherein the $N_{xPUCCH}^{RB}$ physical resource blocks of the xPUCCH is a number of resource blocks in the xPUCCH and consist of contiguous resource blocks or non-contiguous resource blocks that are distributed across an UL transmission band or a set of resource blocks configured by higher layers.

3. The apparatus of claim 1, wherein the one or more processors and memory are further configured to:
define a resource value for the xPUCCH transmission as $N_{xPUCCH}^{(p)}$, where P is an antenna port index, wherein the resource value is the xPUCCH resource index; or
determine, according to the resource value, a frequency resource allocated for the xPUCCH transmission, an orthogonal cover code index ($n_{oc}$), a comb index ($n_{comb}$), or a combination thereof.

4. The apparatus of claim 3, wherein the one or more processors and memory are further configured to:
multiplex the xPUCCH transmission within one xPUCCH frequency resource using code division multiplexing (CDM), wherein the frequency resource allocated for the xPUCCH transmission and the orthogonal cover code index ($n_{oc}$) is defined as:

$$\begin{cases} m = \lfloor n_{xPUCCH}^{(p)} / N_{SF}^{xPUCCH} \rfloor, \; m = 0, 1, \ldots, K-1 \\ n_{oc} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource; or
multiplex the xPUCCH transmission within one xPUCCH frequency resource using frequency division multiplexing (FDM), wherein the frequency resource allocated for the xPUCCH transmission and the comb index ($n_{comb}$) is defined as:

$$\begin{cases} m = \lfloor n_{xPUCCH}^{(p)}/N_{SF}^{xPUCCH} \rfloor, & m = 0, 1, \ldots, K-1 \\ n_{comb} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource.

5. The apparatus of claim 3, wherein the resource value of $N_{xPUCCH}^{(p)}$ for transmitting the xPUCCH is semi-statically configure by one or more higher layers.

6. The apparatus of claim 3, wherein the xPUCCH resource index defined as $n_{xPUCCH}^{(p)}$ is signaled in the DCI.

7. The apparatus of claim 3, wherein resource allocation for the xPUCCH transmission occurs after a PUSCH resource allocation type 0 or a PUSCH resource allocation type 1.

8. The apparatus of claim 3, wherein a hashing function is defined as a function of a Cell Radio Network Temporary Identifier (C-RNTI) of the UE, a slot or subframe index for the UE to determine the frequency resource for transmission of the xPUCCH.

9. The apparatus of claim 3, wherein the comb index ($n_{comb}$) or orthogonal cover code index ($n_{oc}$) is explicitly indicated in downlink control information that carries a scheduling grant of the xPUCCH transmission or configured by higher layers via UE specific dedicated RRC signalling, and wherein a starting resource block of the xPUCCH transmission is equivalent to one of a lowest or a highest index physical resource block (PRB) used for transmission of an associated xPDSCH or and associated xPDCCH, wherein the apparatus includes at least one of an antenna, a touch sensitive display screen, a speaker, a microphone, a graphics processor, a baseband processor, an application processor, internal memory, a non-volatile memory port, and combinations thereof.

10. The method of claim 1, wherein a subframe index for the xPUCCH transmission is determined from a subframe index of a corresponding DCI transmission; wherein an additional field is used in combination with the resource allocation field to indicate the one or more xPUCCH resource indices in one of a Time-Division Duplex (TDD) domain, frequency division duplex (FDD) domain, code domain, or combination thereof.

11. The apparatus of claim 1, wherein the xPUCCH resource index is derived from at least one of a plurality of parameters, wherein the plurality of parameters include at least one of a control channel element (CCE) index, a orthogonal frequency-division multiplexing (OFDM) symbol index for a corresponding xPDCCH transmission, a Demodulation Reference Signal (DM-RS) index, an antenna port index used for a corresponding advanced physical downlink shared channel (xPDSCH) or the corresponding xPDCCH transmission, a physical resource block (PRB) index for the corresponding xPDSCH transmission, a subframe index for the corresponding xPDSCH transmission, a physical cell identity (ID), a virtual cell ID, cell specific parameters, UE specific parameters, a control channel set index, an xPUCCH resource index of a first HARQ-ACK response at a start of semi-persistent xPDSCH scheduling, and a Cell Radio Network Temporary Identifier (C-RNTI) of the UE.

12. The apparatus of claim 11, wherein the one or more processors and memory are further configured to:
determine the xPUCCH transmission, for the UE that is configured with one antenna port for transmitting the xPUCCH, according to equation:

$$n_{xPUCCH}^{(p0)} = c_0 \cdot n_{CCE} + c_1 \cdot I_{sym} + c_2 \cdot D_{xPUCCH},$$

where $c_0$, $c_1$, $c_2$ are predefined or configured by higher layers via an advanced master information block (xMIB), an advanced system information block (xSIB), or a UE specific dedicated radio resource control (RRC) signaling, where $n_{CCE}$ and $I_{sym}$ are a lowest CCE index and OFDM symbol index for the xPDCCH transmission, respectively, $D_{xPUCCH}$ is a configured parameter that is one of cell specific or UE specific and $p_0$ is an antenna port; or
determine the xPUCCH transmission for a second antenna port, for the UE with at least two antenna ports for transmitting the xPUCCH, according to equation:

$$n_{xPUCCH}^{(p1)} = c_0 \cdot n_{CCE} + c_1 \cdot I_{sym} + c_2 \cdot D_{xPUCCH} \times \Delta,$$

where $\Delta$ is a constant and $p_1$ is the second antenna port.

13. The apparatus of claim 11, wherein the one or more processors and memory are further configured to:
determine the xPUCCH transmission, for the UE that is configured with one antenna port for transmitting the xPUCCH, according to equation:

$$n_{xPUCCH}^{(p0)} = b_0 \cdot I_{PRB} + b_1 \cdot n_{DMRS} + b_2,$$

where $b_0$, $b_1$, $b_2$ are predefined or configured by higher layers via an advanced master information block (xMIB), an advanced system information block (xSIB), or a UE specific dedicated radio resource control (RRC) signaling, where $I_{PRB}$ and $n_{DMRS}$ are a lowest physical resource block index and Demodulation Reference Signal (DM-RS) index for a corresponding xPDSCH transmission, respectively, and $p_0$ is an antenna port; or
determine the xPUCCH transmission for a second antenna port, for the UE with at least two antenna ports for transmitting the xPUCCH, according to equation:

$$n_{xPUCCH}^{(p1)} = b_0 \cdot I_{PRB} + b_1 \cdot n_{DRMS} + b_2 + \Delta,$$

where $\Delta$ is a constant and $p_1$ is the second antenna port.

14. The apparatus of claim 11, wherein the one or more processors and memory are further configured to:
determine the xPUCCH transmission, for the UE that is configured with one antenna port for transmitting the xPUCCH, according to equation:

$$n_{xPUCCH}^{(p0)} = a_0 \cdot N_{cell}^{ID} + a_1 \cdot k_{xPUCCH} + a_2,$$

where $a_0$, $a_1$, $a_2$ are predefined or configured by higher layers via an advanced master information block (xMIB), an advanced system information block (xSIB), or a UE specific dedicated radio resource control (RRC) signaling, where $N_{cell}^{ID}$ is the physical cell ID or the virtual cell ID and $k_{xPUCCH}$ is a UE specific parameter that is configured by the UE specific RRC signalling, and $p_0$ is an antenna port and 0 is zero or a positive integer; or
determine the xPUCCH transmission for a second antenna port, for the UE with at least two antenna ports for transmitting the xPUCCH, according to equation:

$$n_{xPUCCH}^{(p1)} = a_0 \cdot N_{cell}^{ID} + a_1 \cdot k_{xPUCCH} + a_2 + \Delta,$$

where $\Delta$ is a constant and $p_1$ is the second antenna port.

15. The apparatus of claim 1, wherein the xPUCCH resource index allocated for the xPUCCH transmission is explicitly signaled in downlink control information (DCI), wherein the DCI format is used to signal one set index from two sets of xPUCCH resource indexes.

16. The apparatus of claim 1, wherein a length for transmitting the xPUCCH or a number of resource blocks of the xPUCCH is predefined; wherein a resource allocation field in a scheduling grant for transmitting the xPUCCH includes a starting resource block ($RB_{START}$).

17. The apparatus of claim 16, wherein the resource allocation field in the scheduling grant for the transmission of xPUCCH consists of a starting resource block group ($RBG_{START}$).

18. The apparatus of claim 16, wherein the length of the xPUCCH transmission is included in the scheduling grant.

19. The apparatus of claim 16, wherein the length of the xPUCCH transmission is determined from the xPDCCH transmission that is used to schedule a corresponding xPUCCH transmission; wherein the length of the xPUCCH transmission is defined as a function of aggregation level used for transmitting the xPDCCH.

20. An apparatus of a User Equipment (UE), the UE configured to communicate with a base station, the apparatus comprising:
    one or more processors and memory configured to:
        determine, at the UE, an advanced physical uplink control channel (xPUCCH) resource index to designate one or more physical resources for transmission of the xPUCCH, wherein the one or more physical resources are multiplexed using at least one or more of frequency division multiplexing (FDM), code division multiplexing (CDM), or combination thereof;
        configure one or more xPUCCH resource indices by higher layer signaling via UE specific radio resource control (RRC) signaling, wherein a resource allocation field in downlink control information (DCI) is used to indicate the xPUCCH resource index out of the one or more xPUCCH resource indices for transmission of the xPUCCH; and
        signal a transceiver of the UE to transmit to the base station uplink control information (UCI) using the one or more physical resources designated by the xPUCCH resource index, wherein each xPUCCH transmission occupies $N_{xPUCCH}^{RB}$ physical resource blocks, wherein the $R_{xPUCCH}^{RB}$ physical resource blocks of the xPUCCH is a number of resource blocks in the xPUCCH and consist of contiguous resource blocks or non-contiguous resource blocks that are distributed across an UL transmission band or a set of resource blocks configured by higher layers.

21. The apparatus of claim 20, wherein the one or more processors and memory are further configured to:
    define a resource value for the xPUCCH transmission as $N_{xPUCCH}^{RB}$, where P is an antenna port index, wherein the resource value is the xPUCCH resource index; or
    determine, according to the resource value, a frequency resource allocated for the xPUCCH transmission, an orthogonal cover code index ($n_{oc}$), a comb index ($n_{comb}$), or a combination thereof.

22. The apparatus of claim 21, wherein the one or more processors and memory are further configured to:
    multiplex the xPUCCH transmission within one xPUCCH frequency resource using code division multiplexing (CDM), wherein the frequency resource allocated for the xPUCCH transmission and the orthogonal cover code index ($n_{oc}$) is defined as:

$$\begin{cases} m = \lfloor n_{xPUCCH}^{(p)}/N_{SF}^{xPUCCH} \rfloor, \ m = 0, 1, \ldots, K-1 \\ n_{oc} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource; or
    multiplex the xPUCCH transmission within one xPUCCH frequency resource using frequency division multiplexing (FDM), wherein the frequency resource allocated for the xPUCCH transmission and the comb index ($n_{comb}$) is defined as:

$$\begin{cases} m = \lfloor n_{xPUCCH}^{(p)}/N_{SF}^{xPUCCH} \rfloor, \ m = 0, 1, \ldots, K-1 \\ n_{comb} = n_{xPUCCH}^{(p)} \bmod N_{SF}^{xPUCCH} \end{cases},$$

where (m) is the frequency resource, mod is a modulo operation, and $N_{SF}^{xPUCCH}$ is a spreading factor within each xPUCCH frequency resource.

23. The apparatus of claim 20, wherein the xPUCCH resource index is derived from at least one of a plurality of parameters, wherein the plurality of parameters include at least one of a control channel element (CCE) index, a orthogonal frequency-division multiplexing (OFDM) symbol index for a corresponding xPDCCH transmission, a Demodulation Reference Signal (DM-RS) index, an antenna port index used for a corresponding advanced physical downlink shared channel (xPDSCH) or the corresponding xPDCCH transmission, a physical resource block (PRB) index for the corresponding xPDSCH transmission, a sub-frame index for the corresponding xPDSCH transmission, a physical cell identity (ID), a virtual cell ID, cell specific parameters, UE specific parameters, a control channel set index, an xPUCCH resource index of a first HARQ-ACK response at a start of semi-persistent xPDSCH scheduling, and a Cell Radio Network Temporary Identifier (C-RNTI) of the UE.

24. The apparatus of claim 23, wherein the one or more processors and memory are further configured to:
    determine the xPUCCH transmission, for the UE that is configured with one antenna port for transmitting the xPUCCH, according to equation:

$$n_{xPUCCH}^{(p0)} = c_0 \cdot n_{CCE} + c_1 \cdot I_{sym} + c_2 \cdot D_{xPUCCH},$$

where $c_0$, $c_1$, $c_2$ are predefined or configured by higher layers via an advanced master information block (xMIB), an advanced system information block (xSIB), or a UE specific dedicated radio resource control (RRC) signaling, where $n_{CCE}$ and $I_{sym}$ are a lowest CCE index and OFDM symbol index for the xPDCCH transmission, respectively, $D_{xPUCCH}$ is a configured parameter that is one of cell specific or UE specific, and $p_0$ is an antenna port; or determine the xPUCCH transmission for a second antenna port, for the UE with at least two antenna ports for transmitting the xPUCCH, according to equation:

$$n_{xPUCCH}^{(p1)} = c_0 \cdot n_{CCE} + c_1 \cdot I_{sym} + c_2 \cdot D_{xPUCCH} + \Delta,$$

where $\Delta$ is a constant and $p_1$ is the second antenna port;

determine the xPUCCH transmission, for the UE that is configured with one antenna port for transmitting the xPUCCH, according to equation:

$$n_{xPUCCH}^{(p0)} = b_0 \cdot I_{PRB} + b_1 \cdot n_{DMRS} + b_2,$$

where $b_0$, $b_1$, $b_2$ are predefined or configured by higher layers via an advanced master information block (xMIB), an advanced system information block (xSIB), or a UE specific dedicated radio resource control (RRC) signaling, where $I_{PRB}$ and $n_{DMRS}$ are a lowest physical resource block index and Demodulation Reference Signal (DM-RS) index for a corresponding xPDSCH transmission, respectively; or determine the xPUCCH transmission for a second antenna port, for the UE with at least two antenna ports for transmitting the xPUCCH, according to equation:

$$n_{xPUCCH}^{(p1)} = b_0 \cdot I_{PRB} + b_1 \cdot n_{DMRS} + b_2 + \Delta,$$

where $\Delta$ is a constant and $p_1$ is the second antenna port;

determine the xPUCCH transmission, for the UE that is configured with one antenna port for transmitting the xPUCCH, according to equation:

$$n_{xPUCCH}^{(p0)} = a_0 \cdot N_{cell}^{ID} + a_1 \cdot k_{xPUCCH} + a_2,$$

where $a_0$, $a_1$, $a_2$ are predefined or configured by higher layers via an advanced master information block (xMIB), an advanced system information block (xSIB), or a UE specific dedicated radio resource control (RRC) signaling, where $N_{cell}^{ID}$ is the physical cell ID or the virtual cell ID and $k_{xPUCCH}$ is a UE specific parameter that is configured by the UE specific RRC signalling; or determine the xPUCCH transmission for a second antenna port, for the UE with at least two antenna ports for transmitting the xPUCCH, according to equation:

$$n_{xPUCCH}^{(p1)} = a_0 \cdot N_{cell}^{ID} + a_1 \cdot k_{xPUCCH} + a_2 + \Delta,$$

where $\Delta$ is a constant and $p_1$ is the second antenna port.

25. At least one non-transitory machine readable storage medium having instructions embodied thereon for a base station to communicate with a User Equipment (UE), the instructions when executed cause the base station to:

signal a transceiver of the base station to transmit to the UE, one or more parameters in downlink control information (DCI) to enable the UE to determine an advanced physical uplink control channel (xPUCCH) resource index, wherein a resource allocation field in the DCI indicates the xPUCCH resource index out of one or more xPUCCH resource indices configured by higher layer signaling via UE specific radio resource control (RRC) signaling, to designate one or more physical resources for transmission of the xPUCCH, wherein the one or more physical resources are multiplexed using at least one or more of frequency division multiplexing (FDM), code division multiplexing (CDM), or combination thereof; and process, at the base station, uplink control information (UCI) transmitted by the UE using the one or more physical resources designated by the xPUCCH resource index.

26. The at least one non-transitory machine readable storage medium of claim 25, further comprising instructions which when executed cause the base station to:

configure one or more xPUCCH resource indices by higher layer signaling via UE specific radio resource control (RRC) signaling; or indicate by a resource allocation field in downlink control information (DCI) the xPUCCH resource index out of the one or more xPUCCH resource indices for transmission of the xPUCCH.

27. The at least one non-transitory machine readable storage medium of claim 26, wherein a subframe index for the xPUCCH transmission is determined from a subframe index of a corresponding DCI transmission; wherein an additional field is used in combination with the resource allocation field to indicate the one or more xPUCCH resource indices in one of a Time-Division Duplex (TDD) domain, frequency division duplex (FDD) domain, code domain, or combination thereof.

28. The at least one non-transitory machine readable storage medium of claim 25, further comprising instructions which when executed cause the base station to: explicitly signal the xPUCCH resource index allocated for the xPUCCH transmission in the DCI, wherein one or more DCI formats are used to signal one set index from one or more sets of xPUCCH resource indexes.

29. The at least one non-transitory machine readable storage medium of claim 25, further comprising instructions which when executed cause the base station to: explicitly indicate, a comb index ($n_{comb}$) or orthogonal cover code index ($n_{oc}$), in the DCI that carries a scheduling grant of the xPUCCH transmission or configured by higher layers via UE specific dedicated RRC signalling, and wherein a starting resource block of the xPUCCH transmission is equivalent to one of a lowest or a highest index physical resource block (PRB) used for transmission of an associated xPDSCH or and associated xPDCCH.

\* \* \* \* \*